US010622889B2

(12) United States Patent
Jung

(10) Patent No.: US 10,622,889 B2
(45) Date of Patent: Apr. 14, 2020

(54) VOLTAGE CONVERTING APPARATUS AND METHOD OF CONTROLLING VOLTAGE CONVERTING APPARATUS

(71) Applicant: Samsung Electronics Co., Ltd., Suwon-si (KR)

(72) Inventor: Seungchul Jung, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/599,655

(22) Filed: May 19, 2017

(65) Prior Publication Data
US 2018/0062515 A1    Mar. 1, 2018

(30) Foreign Application Priority Data

Aug. 24, 2016 (KR) .................. 10-2016-0107983
Dec. 20, 2016 (KR) .................. 10-2016-0174668

(51) Int. Cl.
*H02M 3/158* (2006.01)
*H02M 3/156* (2006.01)
*H02M 3/335* (2006.01)
*H02M 1/00* (2006.01)

(52) U.S. Cl.
CPC .......... *H02M 3/158* (2013.01); *H02M 3/156* (2013.01); *H02M 3/33561* (2013.01); *H02M 3/1588* (2013.01); *H02M 2001/009* (2013.01); *H02M 2003/1566* (2013.01)

(58) Field of Classification Search
CPC ............... H02M 3/156; H02M 3/158; H02M 2003/1566
See application file for complete search history.

(56) References Cited

U.S. PATENT DOCUMENTS

| 5,617,015 A * | 4/1997 | Goder ............... G05F 1/56 323/282 |
| 7,432,614 B2 | 10/2008 | Ma et al. |
| 8,773,087 B2 | 7/2014 | Otte et al. |
| 8,773,088 B2 | 7/2014 | Menegoli et al. |
| 8,786,211 B2 | 7/2014 | Gilliom |

(Continued)

FOREIGN PATENT DOCUMENTS

| KR | 10-1009458 B1 | 1/2011 |
| KR | 10-1013153 B1 | 2/2011 |
| KR | 10-1284976 B1 | 7/2013 |
| KR | 10-1350995 B1 | 1/2014 |

OTHER PUBLICATIONS

Li, Ye, et al., "Control of Input-Series and Output-Independent Power Converter Building Block System Based on Buck Converter Topology." *2015 IEEE Applied Power Electronics Conference and Exposition (APEC)*, 2015 (pp. 422-429).

(Continued)

*Primary Examiner* — Yusef A Ahmed
*Assistant Examiner* — Ishrat F Jamali
(74) *Attorney, Agent, or Firm* — NSIP Law

(57) ABSTRACT

A voltage converting apparatus includes a plurality of output channels configured to provide a plurality of output voltages, a main energy transfer circuit configured to transfer, through an inductor, energy of an input power supply to a target output channel among the output channels, and an auxiliary energy transfer circuit connected to one of the output channels.

31 Claims, 13 Drawing Sheets

(56) References Cited

U.S. PATENT DOCUMENTS

| | | | |
|---|---|---|---|
| 9,178,422 B2 | 11/2015 | Dash et al. | |
| 9,479,051 B2* | 10/2016 | Tseng | H02M 3/158 |
| 2003/0006650 A1* | 1/2003 | Tang | G06F 1/26 |
| | | | 307/43 |
| 2004/0201281 A1* | 10/2004 | Ma | H02M 3/158 |
| | | | 307/38 |
| 2010/0026267 A1 | 2/2010 | Easwaran et al. | |
| 2010/0283322 A1 | 11/2010 | Wibben | |
| 2011/0187189 A1 | 8/2011 | Moussaoui et al. | |
| 2013/0082668 A1 | 4/2013 | Tseng et al. | |
| 2013/0234513 A1 | 9/2013 | Bayer | |
| 2015/0311791 A1 | 10/2015 | Tseng et al. | |

OTHER PUBLICATIONS

Li, Ye, et al., "Modelling and Control of Single-Input and Multiple-Output Modular Converter Systems." 2015 IEEE 16th Workshop on Control and Modeling for Power Electronics (COMPEL), 2015 (8 pages in English).

Extended European search report dated Feb. 2, 2018 in corresponding European Patent Application No. 17184660.3 (8 pages in English).

Ma, Dongsheng, Wing-Hung Ki, and Chi-Ying Tsui. "A pseudo-CCM/DCM SIMO switching converter with freewheel switching." IEEE Journal of Solid-State Circuits 38.6 (Jun. 2003): 1007-1014.

Le, Hanh-Phuc, et al. "A single-inductor switching DC-DC converter with five outputs and ordered power-distributive control." IEEE Journal of Solid-State Circuits 42.12 (Dec. 2007): 2706-2714.

Son, Pham Ngoc, "A SIMO DC-DC Buck Converter Using Output Voltage-Related Charge Control Scheme." $122^{nd}$ Master's Thesis (Feb. 2015).

Jung, Min-Yong, et al. "An Error-Based Controlled Single-Inductor 10-Output DC-DC Buck Converter with High Efficiency Under Light Load Using Adaptive Pulse Modulation." IEEE Journal of Solid-State Circuits 50.12 (Dec. 2015): 2825-2838.

European Office Action dated Oct. 10, 2018 in corresponding European Patent Application No. 17184660.3 (4 pages in English).

* cited by examiner

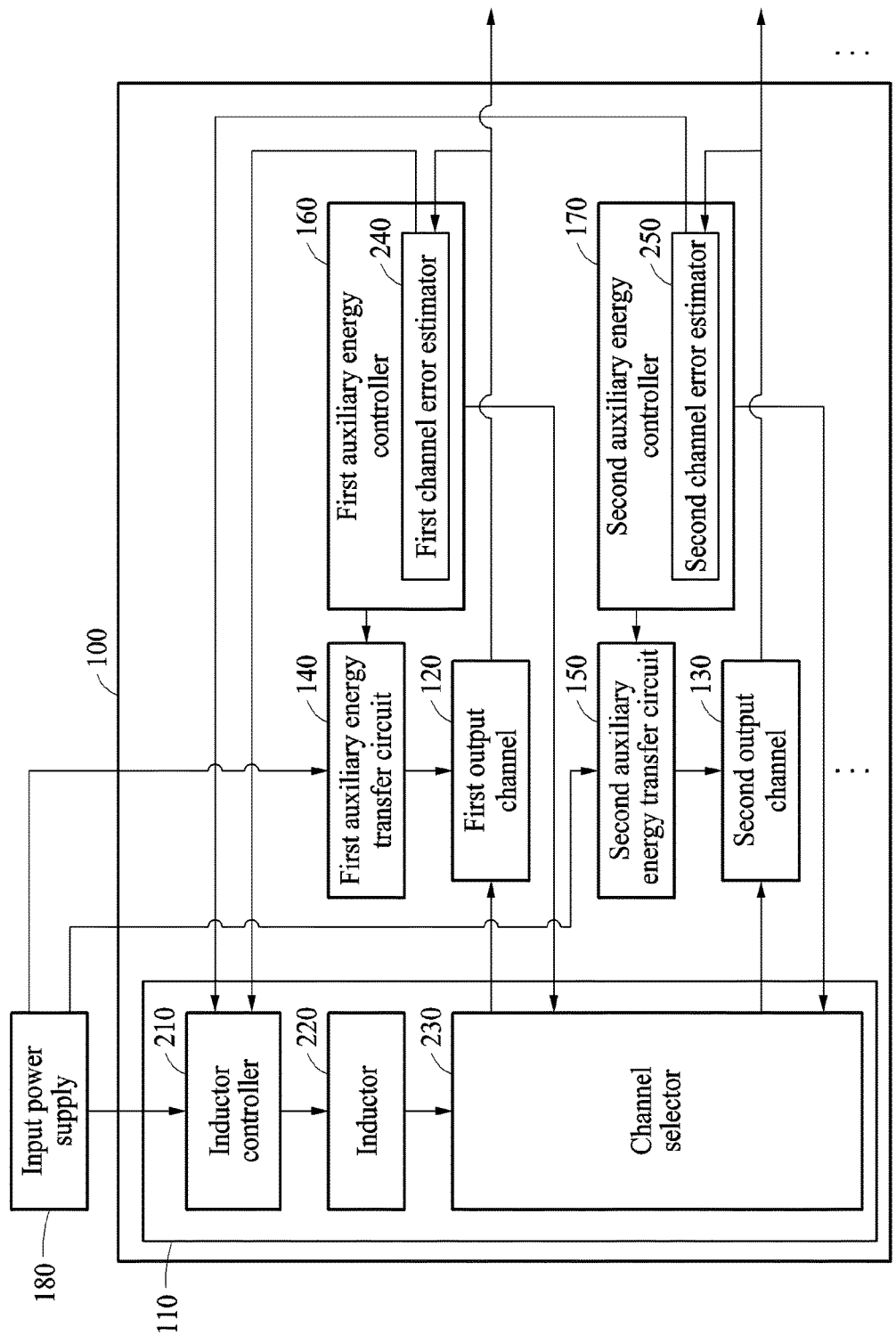

VOLTAGE CONVERTING APPARATUS AND METHOD OF CONTROLLING VOLTAGE CONVERTING APPARATUS

CROSS-REFERENCE TO RELATED APPLICATIONS

This application claims the benefit under 35 USC 119(a) of Korean Patent Application Nos. 10-2016-0107983 filed on Aug. 24, 2016, and 10-2016-0174668 filed on Dec. 20, 2016, in the Korean Intellectual Property Office, the entire disclosures of which are incorporated herein by reference for all purposes.

BACKGROUND

1. Field

The following description relates to a voltage converting apparatus and a method of controlling the voltage converting apparatus.

2. Description of Related Art

A single-inductor multiple-output (SIMO) direct current to direct current (DC-DC) (SIMO DC-DC) converter is a device used to obtain multiple DC output voltages by charging a single inductor with energy, turning on a switch connected to each output channel one at a time, and transferring the energy charged in the inductor to each output channel. The SIMO DC-DC converter performs DC-DC conversion corresponding to each output to obtain a voltage for each output, and receives, as feedback, information on an output voltage of each output to control the DC-DC conversion corresponding to each output, and thus forming a negative feedback loop.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a voltage converting apparatus includes a plurality of output channels configured to provide a plurality of output voltages; a main energy transfer circuit configured to transfer, through an inductor, energy of an input power supply to a target output channel among the output channels; and an auxiliary energy transfer circuit connected to one of the output channels.

The auxiliary energy transfer circuit may be configured to transfer energy to the output channel connected to the auxiliary energy transfer circuit in response to the output channel connected to the auxiliary energy transfer circuit needing energy.

The auxiliary energy transfer circuit may be configured to transfer energy to the output channel connected to the auxiliary energy transfer circuit in response to the output channel connected to the auxiliary energy transfer circuit being in a load transient state.

The main energy transfer circuit may be further configured to determine the target output channel to which energy of the input power supply is to be transferred through the inductor based on an amount of energy to be transferred from the auxiliary energy transfer circuit to the output channel connected to the auxiliary energy transfer circuit.

The main energy transfer circuit may include the inductor, the inductor being configured to transfer energy of the input power supply to the target output channel; and a processor configured to control an amount of energy of the input power supply to be supplied to the inductor; and select, from the output channels, the target output channel to which energy of the inductor is to be transferred.

The apparatus may further include a memory configured to store instructions; and the processor may be further configured to execute the instructions to configure the processor to control the amount of energy of the input power supply to be supplied to the inductor; and select, from the output channels, the target output channel to which energy of the inductor is to be transferred.

The processor may include an inductor controller configured to control the amount of energy of the input power supply to be supplied to the inductor; and a channel selector configured to select, from the output channels, the target output channel to which energy of the inductor is to be transferred.

The inductor controller may be further configured to determine the amount of energy of the input power supply to be supplied to the inductor based on an amount of energy to be transferred from the auxiliary energy transfer circuit to the output channel connected to the auxiliary energy transfer circuit.

The inductor controller may be further configured to increase the amount of energy of the input power supply to be supplied to the inductor in response to energy being transferred from the auxiliary energy transfer circuit to the output channel connected to the auxiliary energy transfer circuit.

The inductor controller may be further configured to maintain constant or decrease the amount of energy of the input power supply to be supplied to the inductor based on an amount of energy required by the output channels in response to energy not being transferred from the auxiliary energy transfer circuit to the output channel connected to the auxiliary energy transfer circuit.

The apparatus may further include additional auxiliary energy transfer circuits respectively connected to remaining ones of the output channels so that the apparatus includes a plurality of auxiliary energy transfer circuits respectively connected to the plurality of output channels in a one-to-one correspondence; each of the auxiliary energy transfer circuits may be configured to transfer energy to the respective output channel connected to the auxiliary energy transfer circuit in response to the respective output channel needing energy; and the channel selector may be further configured to determine, to be the target output channel, the respective output channel connected to a first auxiliary energy transfer circuit among the auxiliary energy transfer circuits in response to a first energy to be transferred from the first auxiliary energy transfer circuit being greater than a second energy to be transferred from a second auxiliary energy transfer circuit among the auxiliary energy transfer circuits.

The apparatus may further include additional auxiliary energy transfer circuits respectively connected to remaining ones of the output channels so that the apparatus includes a plurality of auxiliary energy transfer circuits respectively connected to the plurality of output channels in a one-to-one correspondence; each of the auxiliary energy transfer circuits may be configured to transfer energy to the respective output channel connected to the auxiliary energy transfer circuit in response to the respective output channel needing energy; and the channel selector may be further configured to determine, to be the target output channel, the respective output channel connected to an only auxiliary energy transfer circuit transferring energy among the auxiliary energy transfer circuits.

The apparatus may further include additional auxiliary energy transfer circuits respectively connected to remaining ones of the output channels so that the apparatus includes a plurality of auxiliary energy transfer circuits respectively connected to the plurality of output channels in a one-to-one correspondence; each of the auxiliary energy transfer circuits may be configured to transfer energy to the respective output channel connected to the auxiliary energy transfer circuit in response to the respective output channel needing energy; and the channel selector may be further configured to determine, to be the target output channel, the respective output channel connected to an auxiliary energy transfer circuit transferring a greatest amount of energy among the auxiliary energy transfer circuits.

The channel selector may be further configured to determine, to be the target output channel, an output channel having a greatest error value among error values estimated for respective outputs of the output channels.

The inductor controller may be further configured to determine the amount of energy of the input power supply to be supplied to the inductor based on a sum of error values estimated for respective outputs of the output channels.

The inductor controller may be further configured to determine the amount of energy of the input power supply to be supplied to the inductor based on a sum of error values estimated for respective outputs of the output channels and an amount of energy to be transferred from the auxiliary energy transfer circuit to the output channel connected to the auxiliary energy transfer circuit.

The apparatus may further include a processor configured to control an amount of energy to be transferred from the auxiliary energy transfer circuit to the output channel connected to the auxiliary energy transfer circuit based on an output of the output channel connected to the auxiliary energy transfer circuit.

The apparatus may further include a memory configured to store instructions; and the processor may be further configured to execute the instructions to configure the processor to control the amount of energy to be transferred from the auxiliary energy transfer circuit to the output channel connected to the auxiliary energy transfer circuit based on the output of the output channel connected to the auxiliary energy transfer circuit.

The processor may include an auxiliary energy controller configured to control the amount of energy to be transferred from the auxiliary energy transfer circuit to the output channel connected to the auxiliary energy transfer circuit based on the output of the output channel connected to the auxiliary energy transfer circuit.

The auxiliary energy transfer circuit may be configured to transfer, to the output channel connected to the auxiliary energy transfer circuit, energy of the input power supply or energy of an additional power supply different from the input power supply.

The apparatus may further include additional auxiliary energy transfer circuits respectively connected to remaining ones of the output channels so that the apparatus includes a plurality of auxiliary energy transfer circuits respectively connected to the plurality of output channels in a one-to-one correspondence.

The output channels may be configured to output at least two different output voltages among the output channels.

In another general aspect, a method of controlling a voltage converting apparatus includes measuring an amount of energy to be transferred from an auxiliary energy transfer circuit to an output channel among a plurality of output channels; determining a target output channel to which energy of an input power supply is to be transferred through an inductor among the output channels based on a result of the measuring; and transferring energy of the input power supply to the target output channel through the inductor.

The voltage converting apparatus may include a plurality of auxiliary energy transfer circuits respectively connected to the plurality of output channels in a one-to-one correspondence; each of the auxiliary energy transfer circuits may be configured to transfer energy to the respective output channel connected to the auxiliary energy transfer circuit in response to the respective output channel needing energy; and the determining of the target output channel may include determining, to be the target output channel, the respective output channel connected to an auxiliary energy transfer circuit transferring a greatest amount of energy among the auxiliary energy transfer circuits.

The method may further include controlling an amount of energy to be transferred from the auxiliary energy transfer circuit to the output channel connected to the auxiliary energy transfer circuit based on a result of comparing an output voltage of the output channel connected to the auxiliary energy transfer circuit with a reference voltage.

The controlling of the amount of energy may include decreasing the amount of energy to be transferred from the auxiliary energy transfer circuit to the output channel connected to the auxiliary energy transfer circuit in response to the output voltage of the output channel connected to the auxiliary energy transfer circuit being greater than the reference voltage; and increasing the amount of energy to be transferred from the auxiliary energy transfer circuit to the output channel connected to the auxiliary energy transfer circuit in response to the output voltage of the output channel connected to the auxiliary energy transfer circuit being less than the reference voltage.

The voltage converting apparatus may include a plurality of auxiliary energy transfer circuits respectively connected to the plurality of output channels in a one-to-one correspondence; each of the auxiliary energy transfer circuits may be configured to transfer energy to the respective output channel connected to the auxiliary energy transfer circuit in response to the respective output channel needing energy; and the method may further include increasing an amount of the energy of the input power supply to be supplied to the inductor in response to energy being transferred from any one of the auxiliary energy transfer circuits to the respective output channel.

In another general aspect, a voltage converting apparatus includes an inductor configured to receive energy from an input power supply at an input terminal of the inductor and output the energy from an output terminal of the inductor; a plurality of output channels; a plurality of auxiliary energy transfer circuits respectively connected to the plurality of output channels in a one-to-one correspondence, each of the auxiliary energy transfer circuits being configured to transfer energy to the respective output channel connected to the auxiliary energy transfer circuit; a first switch connecting the input terminal of the inductor to the input power supply; a plurality of second switches respectively connecting the plurality of output channels to the output terminal of the inductor; and a processor configured to control the auxiliary energy transfer circuits to transfer respective amounts of energy needed by the respective output channels to the respective output channels; control the second switches to connect one of the auxiliary energy transfer circuits to the output terminal of the inductor and disconnect all other ones of the auxiliary energy transfer circuits from the output terminal of the inductor based on respective amounts of energy being transferred by the auxiliary energy transfer circuits or respective outputs of the output channels; and control the first switch to adjust an amount of power supplied from the input power supply to the inductor based on either one or both of the respective amounts of energy being transferred by the auxiliary energy transfer circuits and the respective outputs of the output channels.

The voltage converting may further include a memory configured to store instructions; and the processor may be further configured to execute the instructions to configure the processor to control the auxiliary energy transfer circuits to transfer the respective amounts of energy needed by the respective output channels to the respective output channels; control the second switches to connect the one of the auxiliary energy transfer circuits to the output terminal of the inductor and disconnect the all other ones of the auxiliary energy transfer circuits from the output terminal of the inductor based on the respective amounts of energy being transferred by the auxiliary energy transfer circuits or the respective outputs of the output channels; and control the first switch to adjust an amount of power supplied from the input power supply to the inductor based on either one or both of the respective amounts of energy being transferred by the auxiliary energy transfer circuits and the respective outputs of the output channels.

The processor may include a plurality of auxiliary energy controllers respectively configured to respectively control the auxiliary energy transfer circuits to transfer the respective amounts of energy needed by the respective output channels to the respective output channels; an output switch selector configured to control the second switches to connect the one of the auxiliary energy transfer circuits to the output terminal of the inductor and disconnect the all other ones of the auxiliary energy transfer circuits from the output terminal of the inductor based on the respective amounts of energy being transferred by the auxiliary energy transfer circuits or the respective outputs of the output channels; and an inductor control signal generator configured to control the first switch to adjust an amount of power supplied from the input power supply to the inductor based on either one or both of the respective amounts of energy being transferred by the auxiliary energy transfer circuits and the respective outputs of the output channels.

The auxiliary energy controllers may be further configured to respectively estimate respective output errors of the output channels based on the respective outputs of the output channels; the processor may further include an output error summer configured to calculate a sum of the estimated respective output errors of the output channels; and the inductor control signal generator may be further configured to control the first switch to adjust the amount of power supplied from the input power supply to the inductor based on the sum of the estimated respective output errors.

The auxiliary energy controllers may be further configured to respectively output information about the respective amounts of energy being transferred by the auxiliary energy transfer circuits; the processor may further include an auxiliary energy summer configured to calculate a sum of the respective amounts of energy being transferred by the auxiliary energy transfer circuits based on the information output by the auxiliary energy controllers; and the inductor control signal generator may be further configured to control the first switch to adjust the amount of power supplied from the input power supply to the inductor based on the sum of the respective amounts of energy being transferred by the auxiliary energy transfer circuits.

Other features and aspects will be apparent from the following detailed description, the drawings, and the claims.

BRIEF DESCRIPTION OF THE DRAWINGS

FIGS. 2A through 2D are diagrams illustrating examples of a method of controlling a voltage converting apparatus.

Throughout the drawings and the detailed description, the same drawing reference numerals refer to the same elements. The drawings may not be to scale, and the relative size, proportions, and depiction of elements in the drawings may be exaggerated for clarity, illustration, and convenience.

DETAILED DESCRIPTION

Figure 1:
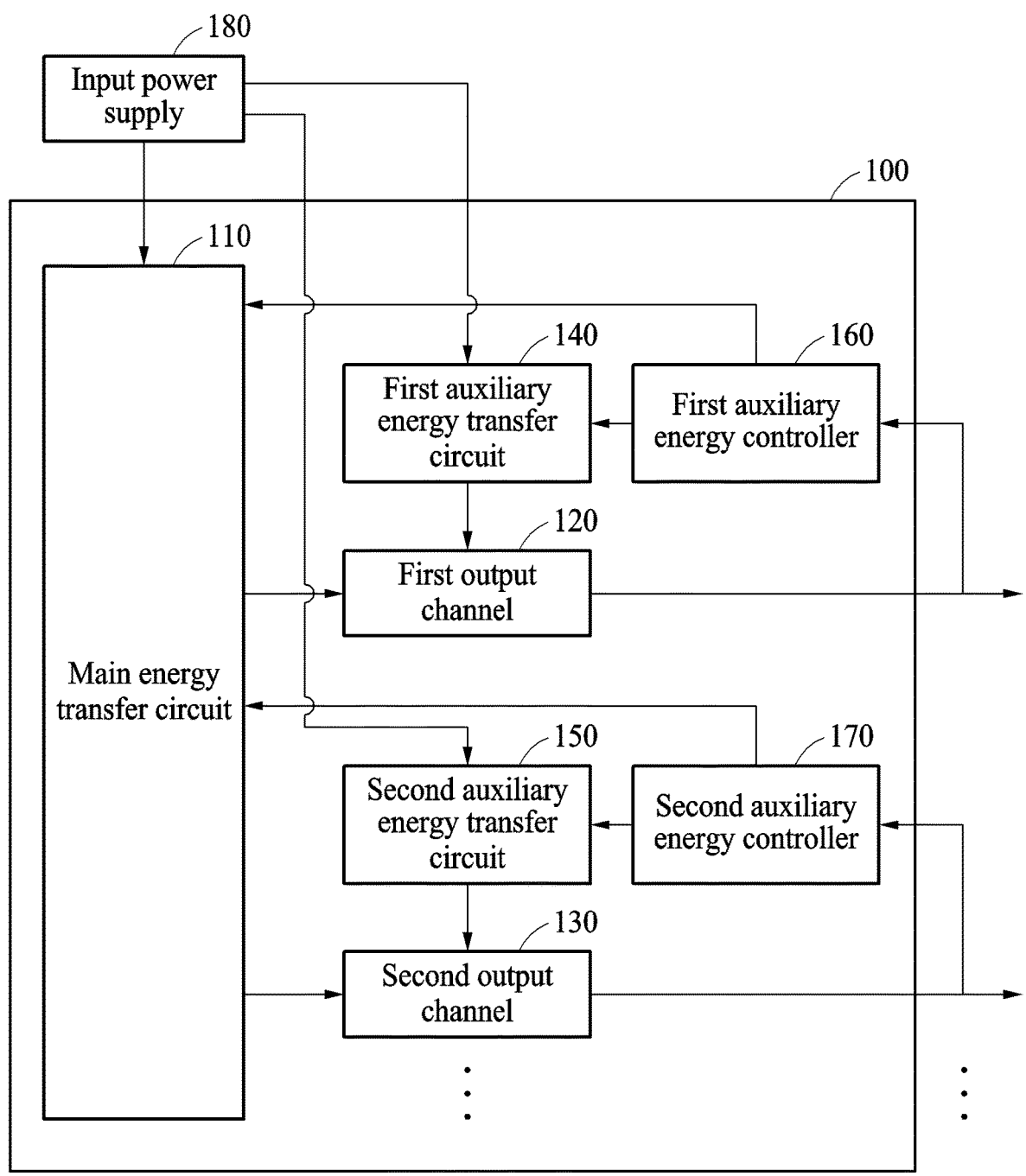
FIG. 1 is a diagram illustrating an example of a configuration of a voltage converting apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" include the plural forms as well, unless the context clearly indicates otherwise. As used herein, the term "and/ or" includes any one and any combination of any two or more of the items listed. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, although terms such as first, second, A, B, (a), and (b) may be used herein to describe components, these terms are used merely to distinguish the components from one another, and do not limit the components in any way. For example, two components described as a "first component" and a "second component" may alternatively be described as a "second component" and a "first component" without changing the meaning of these terms.

Throughout the specification, when an element, such as a layer, region, substrate, or component, is described as being "on," "connected to," or "coupled to" another element, it may be directly "on," directly "connected to," or directly "coupled to" the other element, or there may be one or more other elements intervening therebetween. In contrast, when an element is described as being "directly on," "directly connected to," or "directly coupled to" another element, there can be no other elements intervening therebetween. Likewise, other expressions, for example, "between" and "immediately between" and "adjacent to" and "immediately adjacent to" are also to be construed in the same manner.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a diagram illustrating an example of a configuration of a voltage converting apparatus 100.

The voltage converting apparatus 100 provides a plurality of output voltages through a plurality of output channels, for example, a first output channel 120 and a second output channel 130. The voltage converting apparatus 100 converts, to a one or more voltages, energy transferred from an input power supply 180, and provides the one or more voltages obtained through the conversion through the output channels 120 and 130. The input power supply 180 may be, for example, a DC power supply, such as a battery, or an alternating current to direct current (AC-DC) converting apparatus that supplies DC power by rectifying a commercial AC power supply. In one example, the voltage converting apparatus 100 converts energy of a DC power supply providing a voltage of 4 volts (V) to output voltages of 0.6 V, 0.8 V, and 2 V, and provides the output voltages through respective output channels.

Referring to FIG. 1, the voltage converting apparatus 100 includes the output channels, for example, the first output channel 120 and the second output channel 130, a main energy transfer circuit 110, and at least one auxiliary energy transfer circuit, for example, a first auxiliary energy transfer circuit 140 and a second auxiliary energy transfer circuit 150. In the example illustrated in FIG. 1, the voltage converting apparatus 100 includes the two output channels 120 and 130, and the output channels 120 and 130 output a same output voltage, or two different output voltages.

The main energy transfer circuit 110 transfers energy of the input power supply 180 to the output channels 120 and 130 through an inductor. The main energy transfer circuit 110 determines, among all the output channels, an output channel to which energy of the input power supply 180 is to be supplied. The determined output channel to which energy of the input power supply 180 is to be supplied at a point in time or in a time period among the output channels is also referred to as a target output channel. For example, the main energy transfer circuit 110 determines the target output channel to which energy of the input power supply 180 is to be transferred through the inductor based on an amount of energy to be transferred to an output channel.

In addition, the main energy transfer circuit 110 determines an amount of energy of the input power supply 180 to be supplied to the target output channel and a period of time for which the amount of energy of the input power supply 180 is to be supplied to the target output channel. In one example, the main energy transfer circuit 110 transfers, using a single inductor, energy of the input power supply 180 to the output channels 120 and 130 through a time division method. In one example, energy accumulated in the inductor is transferred only to the first output channel 120 in a first time period and only to the second output channel 130 in a second time period under the control of the main energy transfer circuit 110. Various methods of selecting the target output channel and controlling an amount of energy of the inductor will be described in detail with reference to FIGS. 2A through 2D.

Each of the auxiliary energy transfer circuits 140 and 150 is connected to a respective one of the output channels of the voltage converting apparatus 100, and transfers energy to the respective output channel. In one example, all of the output channels are connected to respective auxiliary energy transfer circuits so that there is a one-to-one correspondence between the auxiliary energy transfer circuits and the output channels, and in another example, only some of the output channels are connected to respective auxiliary energy transfer circuits, while remaining ones of the output channels are not connected to any auxiliary energy transfer circuit. Although FIG. 1 illustrates an example in which the auxiliary energy transfer circuits 140 and 150 are respectively connected to the first output channel 120 and the second output channel 130, an auxiliary energy transfer circuit may be connected only to the first output channel 120 or only to the second output channel 130. The auxiliary energy transfer circuits 140 and 150 respectively connected to the output channels 120 and 130 operate independently from each other.

Each of the auxiliary energy transfer circuits 140 and 150, like the main energy transfer circuit 110, transfers energy to an output channel, except that each of the auxiliary energy transfer circuits 140 and 150 transfers energy to an output channel without using an inductor like that used by the main energy transfer circuit 110. When an output channel to which each of the auxiliary energy transfer circuits 140 and 150 is connected needs energy, for example, a current, the auxiliary energy transfer circuits 140 and 150 perform an auxiliary function of transferring energy to the output channel. In one example, the auxiliary energy transfer circuits 140 and 150 transfer energy of the input power supply 180 or energy of an additional power supply, for example, an additional battery, that is different from the input power supply 180 to an output channel. The auxiliary energy transfer circuits 140 and 150 are able to transfer energy to an output channel more rapidly than the main energy transfer circuit 110. Each of the auxiliary energy transfer circuits 140 and 150 may include, for example, a current source configured to supply a current to an output channel based on energy of the input power supply 180, or a variable resistor configured to convert a voltage of the input power supply 180 to a current.

The auxiliary energy transfer circuits 140 and 150 are controlled by auxiliary energy controllers, for example, a first auxiliary energy controller 160 and a second auxiliary energy controller 170. The auxiliary energy controllers 160 and 170 control an amount of energy to be transferred from the auxiliary energy transfer circuits 140 and 150 to the output channels 120 and 130, respectively, based on output voltages of the output channels 120 and 130. In one example, when each of the auxiliary energy transfer circuits 140 and 150 includes a current source, the auxiliary energy controllers 160 and 170 control a time at which the current source is to output a current to the output channels 120 and 130 and an amount of the current to be output. In another example, when each of the auxiliary energy transfer circuits 140 and 150 includes a variable resistor, the auxiliary energy controllers 160 and 170 control an amount of a current to be transferred to the output channels 120 and 130 by adjusting a resistance value of the variable resistor.

Each of the auxiliary energy controllers 160 and 170 estimates an error of the output channels 120 and 130 based on an output voltage of the output channels 120 and 130 and a reference voltage, and controls the auxiliary energy transfer circuits 140 and 150 based on the estimated error. In one example, the auxiliary energy controllers 160 and 170 transfer, to the main energy transfer circuit 110, any one or any combination of any two or more of output information of the output channels 120 and 130, control information of the auxiliary energy transfer circuits 140 and 150, and state information of the auxiliary energy transfer circuits 140 and 150, and the main energy transfer circuit 110 determines the target output channel or controls an energy of the inductor based on the information received from the auxiliary energy controllers 160 and 170. The state information of the auxiliary energy transfer circuits 140 and 150 may include information as to whether the auxiliary energy transfer circuits 140 and 150 are to transfer energy to the output channels 120 and 130, or information on energy to be transferred from the auxiliary energy transfer circuits 140 and 150 to the output channels 120 and 130, for example, an amount of a current to be output from the auxiliary energy transfer circuits 140 and 150 to the output channels 120 and 130.

When a load state of an output channel changes rapidly, the output channel passes through a load transient state and then reaches a load steady state. In one example, when an output channel needs a great amount of energy within a short period of time due to a change in a load state, the output channel enters the load transient state and then gradually reaches the load steady state while receiving the needed amount of energy. When the output channels 120 and 130 are in the load transient state, the auxiliary energy transfer circuits 140 and 150 transfer, to the output channels 120 and 130, energy that is urgently needed by the output channels 120 and 130. The output channels 120 and 130 then manage the load transient state through the auxiliary energy transfer circuits 140 and 150. Thus, although the load state of the output channels 120 and 130 changes instantaneously and rapidly, an output voltage is stably provided from the output channels 120 and 130 by energy transferred from the auxiliary energy transfer circuits 140 and 150.

Without the auxiliary energy transfer circuits 140 and 150, energy stored in the inductor is divided and distributed to the output channels 120 and 130, and thus interference may occur between the output channels 120 and 130 when an output of the output channels 120 and 130 changes rapidly. An output voltage of an output channel affected by such interference changes unstably. For example, as a result of the interference, the output voltage of the output channels 120 and 130 may become lower or higher than a target or desired voltage. Such an interference occurring between output channels is referred to as crosstalk. The auxiliary energy transfer circuits 140 and 150 of the voltage converting apparatus 100 provide, to the output channels 120 and 130, energy additionally needed by the output channels 120 and 130 when the output channels 120 and 130 are in the load transient state before reaching the load steady state after the load state of the output channels 120 and 130 changes rapidly, and thus the interference between the output channels 120 and 130 is reduced. In terms of energy, each of the output channels 120 and 130 are independent from each other due to the auxiliary energy transfer circuits 140 and 150, and thus the voltage converting apparatus 100 reduces an error caused by interference between the output channels 120 and 130.

FIGS. 2A through 2D are diagrams illustrating examples of a method of controlling a voltage converting apparatus.

Referring to FIGS. 2A through 2D, a main energy transfer circuit 110 includes an inductor controller 210, an inductor 220, and a channel selector 230. The inductor controller 210 controls energy of an input power supply 180 to be supplied to the inductor 220, and the inductor 220 transfers, to a target output channel, energy transferred from the input power supply 180. The inductor controller 210 estimates a state of each of output channels 120 and 130 and a state of each of auxiliary energy transfer circuits 140 and 150 based on various pieces of information transferred from auxiliary energy controllers 160 and 170, for example, an output voltage of the output channels 120 and 130 and an amount of a current to be output from the auxiliary energy transfer circuits 140 and 150, and controls energy of the inductor 220 based on a result of the estimating. For example, the inductor controller 210 determines whether to increase or decrease an amount of energy of the input power supply 180 to be transferred to the inductor 220, or to maintain a current state.

The channel selector 230 selects the target output channel to which energy of the inductor 220 is to be transferred among the output channels 120 and 130. For example, the channel selector 230 selects the target output channel based on either one or both of an amount of energy to be transferred from the auxiliary energy transfer circuits 140 and 150 to the output channels 120 and 130 and an error of each of the output channels 120 and 130 received from channel error estimators 240 and 250. The channel error estimators 240 and 250 estimate the error of each of the output channels 120 and 130 based on an output voltage of the output channels 120 and 130 and a reference voltage. For example, the channel error estimators 240 and 250 estimate the error of each of the output channels 120 and 130 based on a value obtained by integrating a difference between the output voltage of the output channels 120 and 130 and the reference voltage. When the output voltage of the output channels 120 and 130 moves closer to the reference voltage, the error decreases. Conversely, when the output voltage moves further away from the reference voltage, the error increases. A method of selecting the target output channel will be described in detail hereinafter.

The auxiliary energy controllers 160 and 170, the inductor controller 210, the channel selector 230, and the channel error estimators 240 and 250 are implemented by hardware components, for example, by one or more processors and a memory storing instructions that, when executed by the one or more processors, cause the one or more processors to perform the functions of the auxiliary energy controllers 160 and 170, the inductor controller 210, the channel selector 230, and the channel error estimators 240 and 250 that are described herein.

FIGS. 2A through 2D illustrate different examples of a method of selecting a target output channel and controlling energy of an inductor.

Figure 2A:
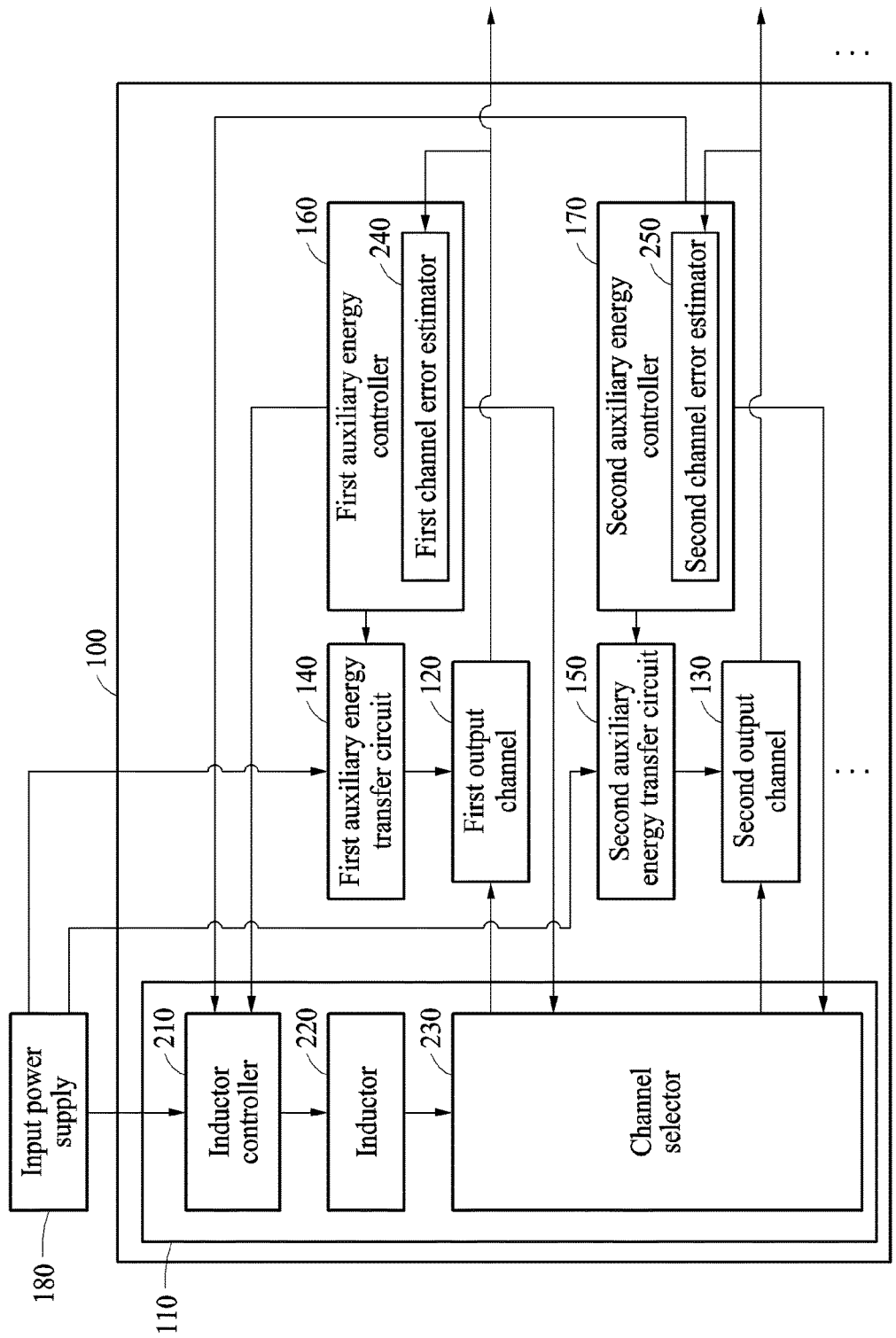

Referring to FIG. 2A, the channel selector 230 selects the target output channel based on amounts of energy to be transferred from the auxiliary energy transfer circuits 140 and 150 to the output channels 120 and 130. For example, when an amount of energy to be transferred from the first auxiliary energy transfer circuit 140 to the first output channel 120 is greater than an amount of energy to be transferred from the second auxiliary energy transfer circuit 150 to the second output channel 130, the channel selector 230 selects, to be the target output channel, the first output channel 120 connected to the first auxiliary energy transfer circuit 140. Conversely, when the amount of energy to be transferred from the second auxiliary energy transfer circuit 150 is greater than the amount of energy to be transferred from the first auxiliary energy transfer circuit 140, the channel selector 230 selects, to be the target output channel, the second output channel 130 connected to the second auxiliary energy transfer circuit 150. In one example, when three or more output channels are present, and the output channels are respectively connected to auxiliary energy transfer circuits, the channel selector 230 selects, to be the target output channel, an output channel connected to an auxiliary energy transfer circuit transferring a greatest amount of energy among the auxiliary energy transfer circuits. In another example, when only the first auxiliary energy transfer circuit 140 transfers energy, the channel selector 230 selects, to be the target output channel, the first output channel 120 connected to the first auxiliary energy transfer circuit 140. When none of auxiliary energy transfer circuits transfers energy, the channel selector 230 selects, to be a target output channel in a current time period, an output channel selected in a previous time period.

When any one of the auxiliary energy transfer circuits 140 and 150 transfers energy to an output channel, the inductor controller 210 increases an amount of energy of the input power supply 180 to be supplied to the inductor 220. The inductor controller 210 determines an amount of energy of the input power supply 180 to be supplied to the inductor 220 based on a total amount of energy to be transferred from the auxiliary energy transfer circuits 140 and 150 to the output channels. When a total amount of energy to be supplied from the auxiliary energy transfer circuits 140 and 150 increases, the inductor controller 210 controls an amount of energy of the input power supply 180 to be supplied to the inductor 220 that is greater than an amount of energy of the input power supply 180 that was previously supplied to the inductor 220. The inductor controller 210 calculates a sum of the amounts of energy to be supplied from the auxiliary energy transfer circuits 140 and 150 to obtain the total amount of energy to be supplied from the auxiliary energy transfer circuits 140 and 150. In a case that neither one of the auxiliary energy transfer circuits 140 and 150 transfers energy to the output channels 120 and 130, the inductor controller 210 maintains constant or decreases an amount of energy of the input power supply 180 to be supplied to the inductor 220. That is, when an amount of energy being transferred from the inductor 220 to the output channels 120 and 130 is equal to an amount of energy required by the output channels 120 and 130, the inductor controller 210 maintains constant an amount of energy of the input power supply 180 to be supplied to the inductor 220. In contrast, when an amount of energy being transferred from the inductor 220 to the output channels 120 and 130 exceeds an amount of energy required by the output channels 120 and 130, the inductor controller 210 decreases an amount of energy of the input power supply to be supplied to the inductor 220.

Figure 2B:
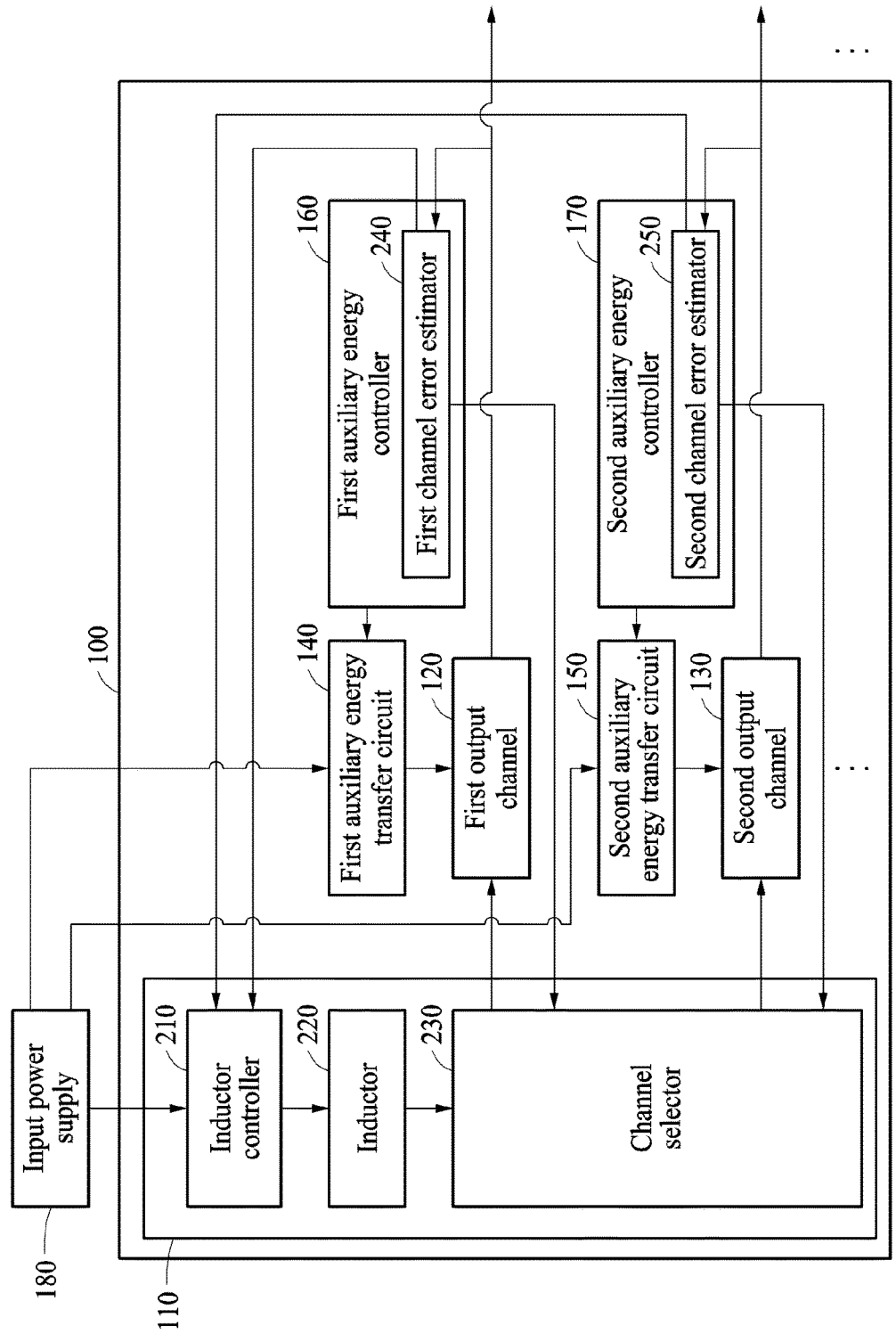

Referring to FIG. 2B, the channel selector 230 receives error information associated with an output of each of the output channels 120 and 130 from the channel error estimators 240 and 250, and selects, to be the target output channel, an output channel having a greatest error value among error values estimated for the respective outputs of the output channels 120 and 130. In addition, the inductor controller 210 receives the error information associated with the output of each of the output channels 120 and 130 from the channel error estimators 240 and 250, and determines an amount of energy of the input power supply 180 to be supplied to the inductor 220 based on the error values estimated for the respective outputs of the output channels 120 and 130. For example, the greater a sum of the error values estimated for the outputs of the output channels 120 and 130, the greater an amount of energy of the input power supply 180 is supplied to the inductor 220 by the inductor controller 210.

Referring to FIG. 2C, as in the example described with reference to FIG. 2A, the channel selector 230 selects, to be the target output channel, an output channel connected to an auxiliary energy transfer circuit transferring a greatest amount of energy among the auxiliary energy transfer circuits 140 and 150. Also, as in the example described with reference to FIG. 2B, the inductor controller 210 determines an amount of energy of the input power supply 180 to be supplied to the inductor 220 based on an error value estimated for an output of each of the output channels 120 and 130. The inductor controller 210 controls the amount of energy of the input power supply 180 to be supplied to the inductor 220 based on a sum of the error values estimated for the respective outputs of the output channels 120 and 130.

Figure 2D:
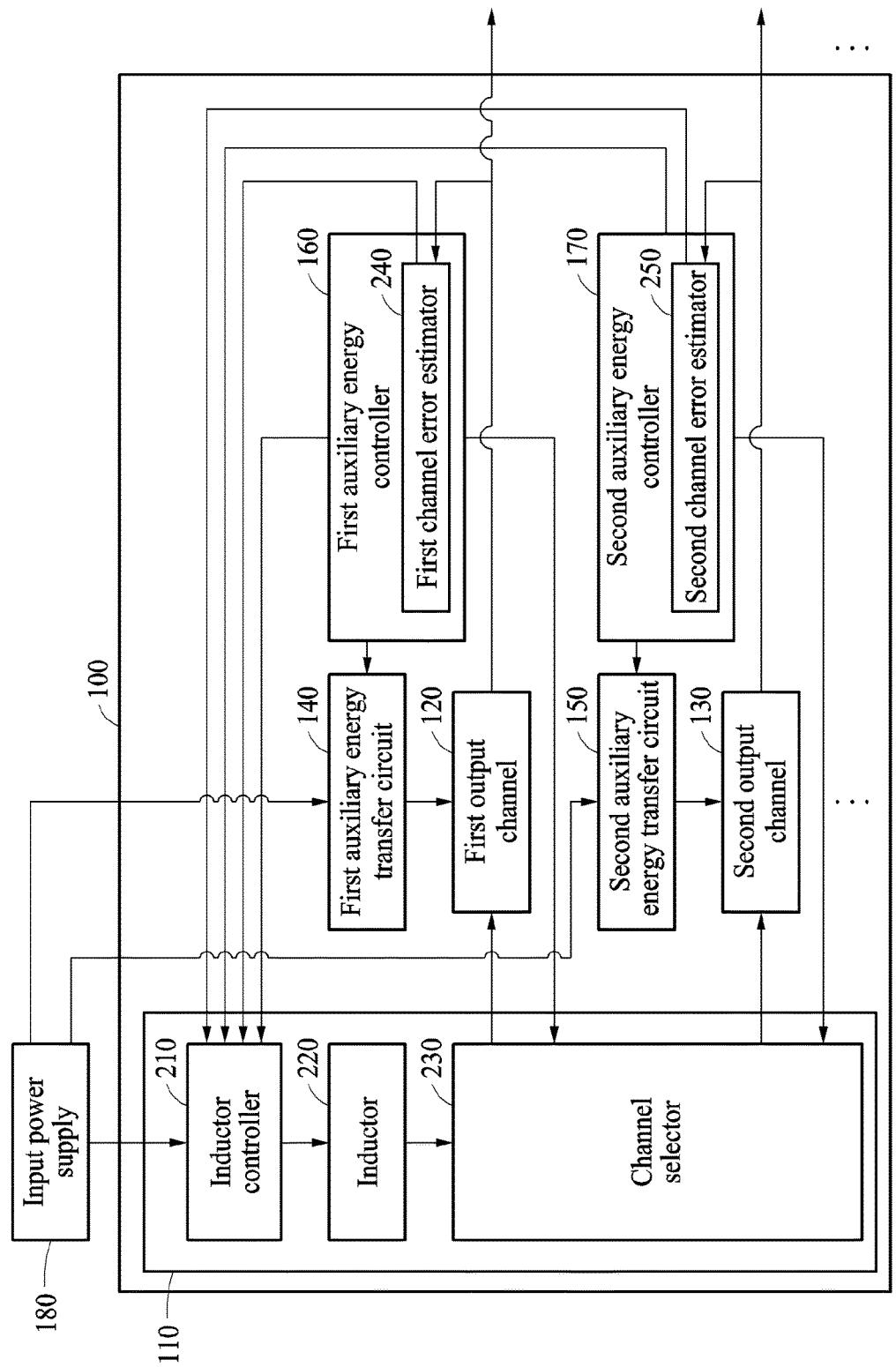

Referring to FIG. 2D, as in the example described with reference to FIG. 2A, the channel selector 230 selects, to be the target output channel, an output channel connected to an auxiliary energy transfer circuit transferring a greatest amount of energy among the auxiliary energy transfer circuits 140 and 150. In contrast to the examples illustrated in FIGS. 2A through 2C, the inductor controller 210 controls an amount of energy of the input power supply 180 to be supplied to the inductor 220 based on both state information of the auxiliary energy transfer circuits 140 and 150 and error information estimated for outputs of the output channels 120 and 130. The state information of the auxiliary energy transfer circuits 140 and 150 may include information as to whether the auxiliary energy transfer circuits 140 and 150 transfer energy to the output channels 120 and 130, and information on an amount of energy to be output from the auxiliary energy transfer circuits 140 and 150. The state information of the auxiliary energy transfer circuits 140 and 150 is generated by the auxiliary energy controllers 160 and 170, and is transferred to the inductor controller 210. The inductor controller 210 determines an amount of energy of the input power supply 180 to be supplied to the inductor 220 based on a sum of error values estimated for the outputs of the output channels 120 and 130 and a sum of amounts of energy to be transferred from the auxiliary energy transfer circuits 140 and 150. When energy is to be supplied from at least one auxiliary energy transfer circuit to an output channel, the inductor controller 210 increases an amount of energy of the input power supply 180 to be supplied to the inductor 220, and determines the increase in the amount of energy based on the sum of the error values estimated for the outputs of the output channels 120 and 130.

Figure 3:
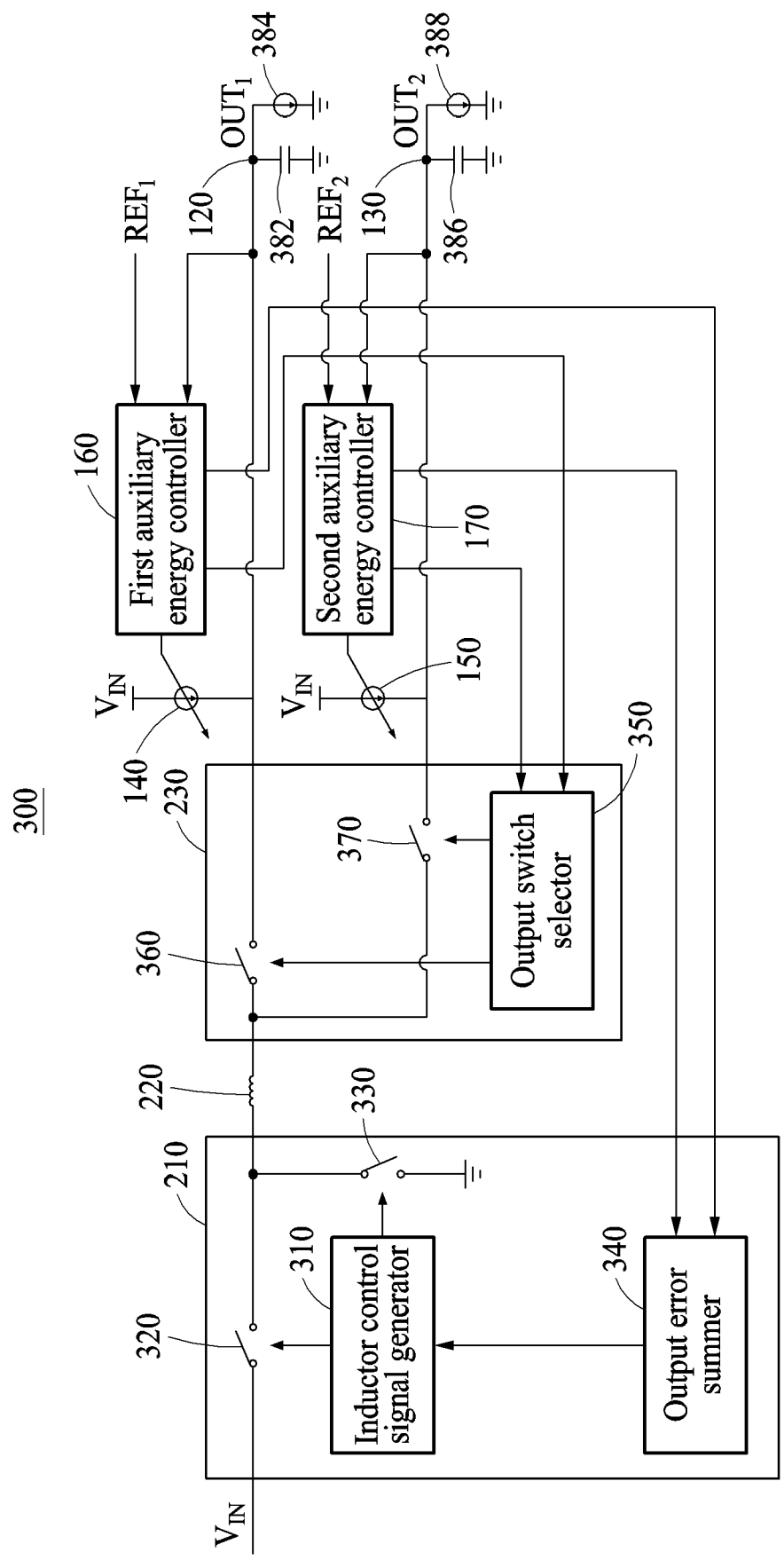
FIG. 3 is a diagram illustrating an example of a circuit of a voltage converting apparatus.

FIG. 3 is a diagram illustrating an example of a circuit 300 of a voltage converting apparatus.

Referring to FIG. 3, the circuit 300 of a voltage converting apparatus includes a single inductor 220 and a plurality of output channels, for example, a first output channel 120 and a second output channel 130, as in a single-inductor multiple-output (SIMO) DC-DC converter. Although it is illustrated in FIG. 3 that the circuit 300 includes the two output channels 120 and 130, the circuit 300 may include three or more output channels in other examples.

The circuit 300 generates a plurality of output voltages, for example, $OUT_1$ and $OUT_2$, using the single inductor 220. The inductor 220 receives energy from an input power supply $V_{IN}$ and accumulates the received energy, and energy of the inductor 220 is controlled by an inductor controller 210. The inductor controller 210 determines an amount of energy to be transferred from the input power supply $V_{IN}$ to the inductor 220, and the energy accumulated in the inductor 220 is transferred to a target output channel selected by a channel selector 230.

The inductor controller 210 includes an inductor control signal generator 310, switches 320 and 330, and an output error summer 340.

The inductor control signal generator 310 generates control signals to control operations of the switches 320 and 330 to control an amount of energy of the input power supply $V_{IN}$ to be supplied to the inductor 220.

Operations of the switches 320 and 330 are controlled by the control signals generated by the inductor control signal generator 310, and whether energy of the input power supply $V_{IN}$ is supplied to the inductor 220 and a duration during which the energy is supplied to the inductor 220 are controlled by the operations of the switches 320 and 330. The control signals control the switches 320 and 330 so that when the switch 320 is turned on, the switch 330 is turned off, and when the switch 320 is turned off, the switch 330 is turned on. Thus, the switches 320 and 330 operate as a synchronous buck converter. As the switches 320 and 330 are alternately turned on and off by the control signals, a square wave that swings between voltages of $V_{IN}$ and 0 (or ground) is applied to an input terminal of the inductor 220 on the left side of the inductor 220. An output voltage of the inductor controller 210 increases the longer the time the voltage $V_{IN}$ is applied to the input terminal of the inductor 220, and decreases the shorter the time the voltage $V_{IN}$ is applied to the input terminal of the inductor 220. Thus, the longer the time the switch 320 is on and the switch 330 is off, the higher the output voltage of the inductor controller 210 and the greater the amount of energy of the input power supply $V_{IN}$ supplied to the inductor 220. Conversely, the longer the time the switch 320 is off and the switch 330 is on, the lower the output voltage of the inductor controller 210 and the lower the amount of energy of the input power supply $V_{IN}$ supplied to the inductor 220.

The output error summer 340 receives error information associated with an output of each of the output channels 120 and 130 from the auxiliary energy controllers 160 and 170, and calculates a sum of error values estimated for the outputs of the output channels 120 and 130 based on the received error information. The inductor control signal generator 310 determines an amount of energy of the input power supply $V_{IN}$ to be supplied to the inductor 220 based on the sum of the error values estimated for the outputs of the output channels 120 and 130.

The channel selector 230 includes an output switch selector 350 and switches 360 and 370. The output switch selector 350 controls the switches 360 and 370 to transfer energy of the inductor 220 to one of the output channels 120 and 130. Under the control of the output switch selector 350, the switches 360 and 370 are turned on or off. For example, when the switch 360 is turned on, energy of the inductor 220 is transferred to the first output channel 120. When the switch 360 is turned off, a connection between the inductor 220 and the first output channel 120 is cut. Similarly, when the switch 370 is turned on, energy of the inductor 220 is transferred to the second output channel 130. When the switch 370 is turned off, a connection between the inductor 220 and the second output channel 130 is cut. The switches 320, 330, 360, and 370 may be implemented, for example, by a transistor and a diode.

The inductor control signal generator 310, the output error summer 340, and the output switch selector 350 are implemented by hardware components, for example, by one or more processors and a memory storing instructions that, when executed by the one or more processors, cause the one or more processors to perform the functions of the inductor control signal generator 310, the output error summer 340, and the output switch selector 350 that are described herein.

In one example, the output switch selector 350 selects, as the target output channel to which energy of the inductor 220 is to be transferred, an output channel receiving a greatest amount of energy from the auxiliary energy transfer circuits 140 and 150 among all of the output channels, or an output channel in which a greatest current flows from the auxiliary energy transfer circuits 140 and 150. In another example, the output switch selector 350 receives the error information associated with the outputs of the output channels 120 and 130 from the auxiliary energy controllers 160 and 170, and determines the target output channel based on the received error information. In one example, the output switch selector 350 determines, to be the target output channel, an output channel having a greatest error value among error values estimated for the outputs of the output channels 120 and 130.

In the example illustrated in FIG. 3, the output channels 120 and 130 include respective output capacitors, that is, a first output capacitor 382 and a second output capacitor 386, and have respective current loads, that is, a first current load 384 and a second current load 388. In the example illustrated in FIG. 3, the first output capacitor 382 and the first current load 384 of the first output channel 120 are connected in parallel, and the second output capacitor 386 and the second current load 388 of the second output channel 130 are connected in parallel.

When the output channels 120 and 130 connected respectively to the auxiliary energy transfer circuits 140 and 150 need energy, the auxiliary energy transfer circuits 140 and 150 respectively supply energy to the output channels 120 and 130. As illustrated in FIG. 3, the auxiliary energy transfer circuits 140 and 150 include a current source configured to supply a current to the output channels 120 and 130 based on energy of the input power supply $V_{IN}$. The auxiliary energy controllers 160 and 170 control an operation of the current source. The auxiliary energy controllers 160 and 170 determine whether the current source outputs a current or not, and control an amount of the current to be output from the current source. In another example (not illustrated in FIG. 3), the auxiliary energy transfer circuits 140 and 150 include a variable resistor between the input power source $V_{IN}$ and an output channel, and the auxiliary energy controllers 160 and 170 control a variable resistance of the variable resistor. The greater the value of the variable resistance, the smaller the amount of the energy supplied to the output channels 120 and 130, and the smaller the value of the variable resistance, the greater the amount of the energy supplied to the output channels 120 and 130.

The auxiliary energy controllers 160 and 170 estimate errors of the output channels 120 and 130 based on the output voltages $OUT_1$ and $OUT_2$ of the output channels 120 and 130 and reference voltages $REF_1$ and $REF_2$, and transfer information on the estimated errors to the output error summer 340 and the output switch selector 350. For example, when a difference between the output voltage $OUT_1$ of the first output channel 120 and the reference voltage $REF_1$ is large, the first auxiliary energy controller 160 determines that an output error of the first output channel 120 is large. Conversely, when the difference is small, the first auxiliary energy controller 160 determines that the output error of the first output channel 120 is small.

Figure 4:
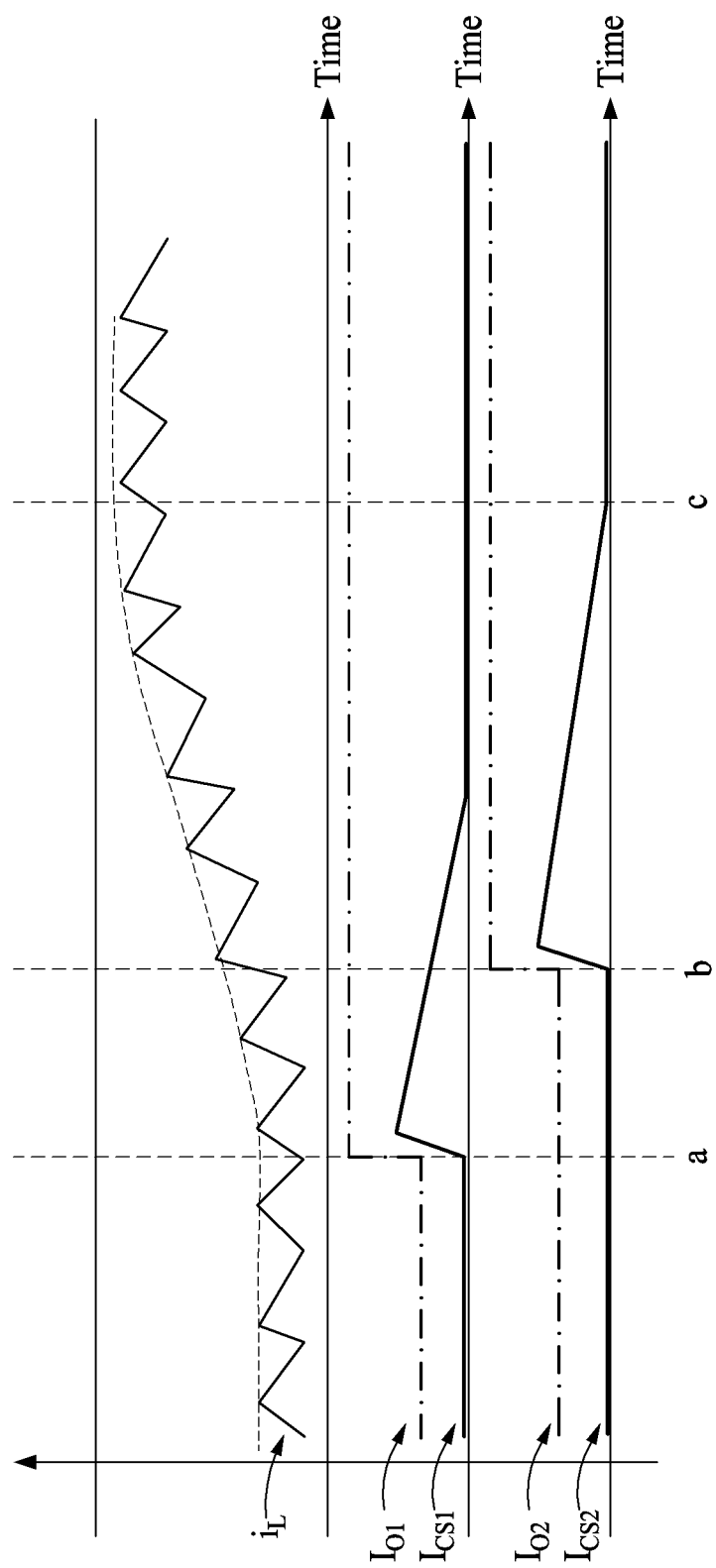
FIG. 4 is a graph illustrating an example of a change in a current of an inductor and a change in an output current of an auxiliary energy transfer circuit based on a change in a load of an output channel.

FIG. 4 is a graph illustrating an example of a change in an inductor current and a change in an output current of an auxiliary energy transfer circuit based on a change in a load of an output channel.

FIG. 4 illustrates time-based changes in an inductor current $i_L$, a load current of each output channel, for example, $I_{O1}$ and $I_{O2}$, and a current, for example, $I_{CS1}$ and $I_{CS2}$, to be transferred to each output channel from each auxiliary energy transfer circuit, in a voltage converting apparatus, for example, the voltage converting apparatus illustrated in FIG. 3, that includes two output channels connected respectively to auxiliary energy transfer circuits, for example, a first output channel and a second output channel, and a single inductor configured to supply energy to the output channels. An amount of the inductor current $i_L$ varies according to an on-time duty cycle of an input power supply connected to the inductor. In FIG. 4, an x axis indicates time, and a y axis indicates a signal amplitude.

Referring to FIG. 4, an instantaneous increase in the load current $I_{O1}$ of the first output channel at a point in time a indicates that the first output channel needs a greater amount of energy instantaneously at the point a. A first auxiliary energy transfer circuit connected to the first output channel then starts transferring the current $I_{CS1}$ to the first output to supply the needed amount of energy to the first output channel. Thus, in response to a change in a load state of the first output channel, the first auxiliary energy transfer circuit transfers the amount of energy needed by the first output channel to the first output channel. Similarly, an instantaneous increase in the load current $I_{O2}$ of the second output channel at a point in time b indicates that the second output channel needs a greater amount of energy instantaneously at the point b. A second auxiliary energy transfer circuit connected to the second output channel then starts transferring the current $I_{CS2}$ to the second output channel to supply the needed amount of energy to the second output channel. Thus, in response to a change in a load state of the second output channel, the second auxiliary energy transfer circuit transfers the amount of energy needed by the second output channel to the second output channel. At the points a and b, the first and the second auxiliary energy transfer circuits operate as an auxiliary energy source. An auxiliary energy transfer circuit is able to transfer energy to an output channel more rapidly than the inductor transferring the main energy. Thus, the voltage converting apparatus is able to respond more rapidly to a change in a load state of the output channel through the auxiliary energy transfer circuit, and thus provide a stable output through the output channel.

In one example, the voltage converting apparatus selects, to be a target output channel, the first output channel connected to the first auxiliary energy transfer circuit because the current $I_{CS1}$ is transferred from the first auxiliary energy transfer circuit in a time period between the points a and b. The voltage converting apparatus increases an amount of energy to be supplied to the inductor because energy is being transferred from the first auxiliary energy transfer circuit to the first output channel. In another example, the voltage converting apparatus controls an amount of energy of the input power supply to be supplied to the inductor based on an error value estimated for an output of each of the first output channel and the second output channel in the time period between the points a and b. When the amount of energy of the input power supply to be supplied to the inductor increases, the inductor current $i_L$ to be output from the inductor also increases, and thus an amount of energy to be transferred from the inductor to the first output channel, which is a current target output channel, increases. When an amount of energy of the inductor to be transferred to the first output channel increases, the voltage converting apparatus gradually decreases the current $I_{CS1}$ to be transferred from the first auxiliary energy transfer circuit to the first output channel. In the example illustrated in FIG. 4, the current $I_{CS1}$ transferred from the first auxiliary energy transfer circuit increases rapidly until the energy of the inductor transferred to the first output channel starts increasing, and then gradually decreases from a point in time at which the energy of the inductor transferred to the first output channel starts increasing.

In a time period between the points b and c, the current $I_{CS1}$ transferred from the first auxiliary energy transfer circuit continues gradually decreasing until the current $I_{CS1}$ is no longer being output from the first auxiliary energy transfer circuit at a point between the points b and c. In addition, the current $I_{CS2}$ starts being transferred from the second auxiliary energy transfer circuit to the second output channel after the point b, and then gradually decreases after reaching a peak value until the current $I_{CS2}$ is no longer being output from the second auxiliary energy transfer circuit at the point c.

In one example, when the currents $I_{CS1}$ and $I_{CS2}$ are both being output from the first and the second auxiliary energy transfer circuits, the voltage converting apparatus compares the current $I_{CS1}$ output from the first auxiliary energy transfer circuit with the current $I_{CS2}$ output from the second auxiliary energy transfer circuit, and selects, to be the target output channel, an output channel connected to an auxiliary energy transfer circuit transferring a greater current. Thus, before a point in time at which the output current $I_{CS2}$ of the second auxiliary energy transfer circuit becomes greater than the output current $I_{CS1}$ of the first auxiliary energy transfer circuit, the first output channel is selected to be the target output channel, and after the point in time at which the output current $I_{CS2}$ of the second auxiliary energy transfer circuit becomes greater than the output current $I_{CS1}$ of the first auxiliary energy transfer circuit, the second output channel is selected to be the target output channel. After the current $I_{CS1}$ is no longer being output from the first auxiliary energy transfer circuit and the current $I_{CS2}$ starts being output only from the second auxiliary energy transfer circuit, the second output channel continues to be selected to be the target output channel.

In a case that a current is transferred from at least one auxiliary energy transfer circuit to an output channel, the voltage converting apparatus increases an amount of energy of the input power supply to be supplied to the inductor. When the amount of energy supplied to the inductor increases and an amount of energy of the inductor to be supplied to the target output channel increases, the voltage converting apparatus decreases a current to be output from the auxiliary energy transfer circuit.

After a point in time c, an amount of energy transferred from the inductor reaches a total amount of energy needed by the first output channel and the second output channel, the output currents $I_{CS1}$ and $I_{CS2}$ are no longer to be transferred from the first and the second auxiliary energy transfer circuits to the first and the second output channels, and the energy transferred from the inductor is divided and distributed to the first and the second output channels through a time-division method. Such a state is referred to as a load steady state, and the energy of the inductor is supplied alternately to the first output channel and the second output channel based on time in the load steady state.

In one example, in the load transient state, the voltage converting apparatus initially transfers a deficient amount of energy to an output channel from an auxiliary energy transfer circuit, and controls an inductor and the auxiliary energy transfer circuit so that an amount of energy to be supplied from the inductor gradually reaches a total amount of energy needed by the output channel. In the load transient state, energy is transferred to the output channel from both the auxiliary energy transfer circuit and the inductor. In the load steady state in which an amount of energy transferred from the inductor becomes equal to a total amount of energy needed by the output channel, energy is transferred to the output channel only from the inductor. Thus, when a load state of the output channel changes rapidly, a deficient amount of energy needed by the output channel is supplied by the auxiliary energy transfer circuit connected to the output channel, and energy supplied to the output channel from the inductor gradually increases until finally energy is transferred to the output channel only from the inductor.

Figure 5:
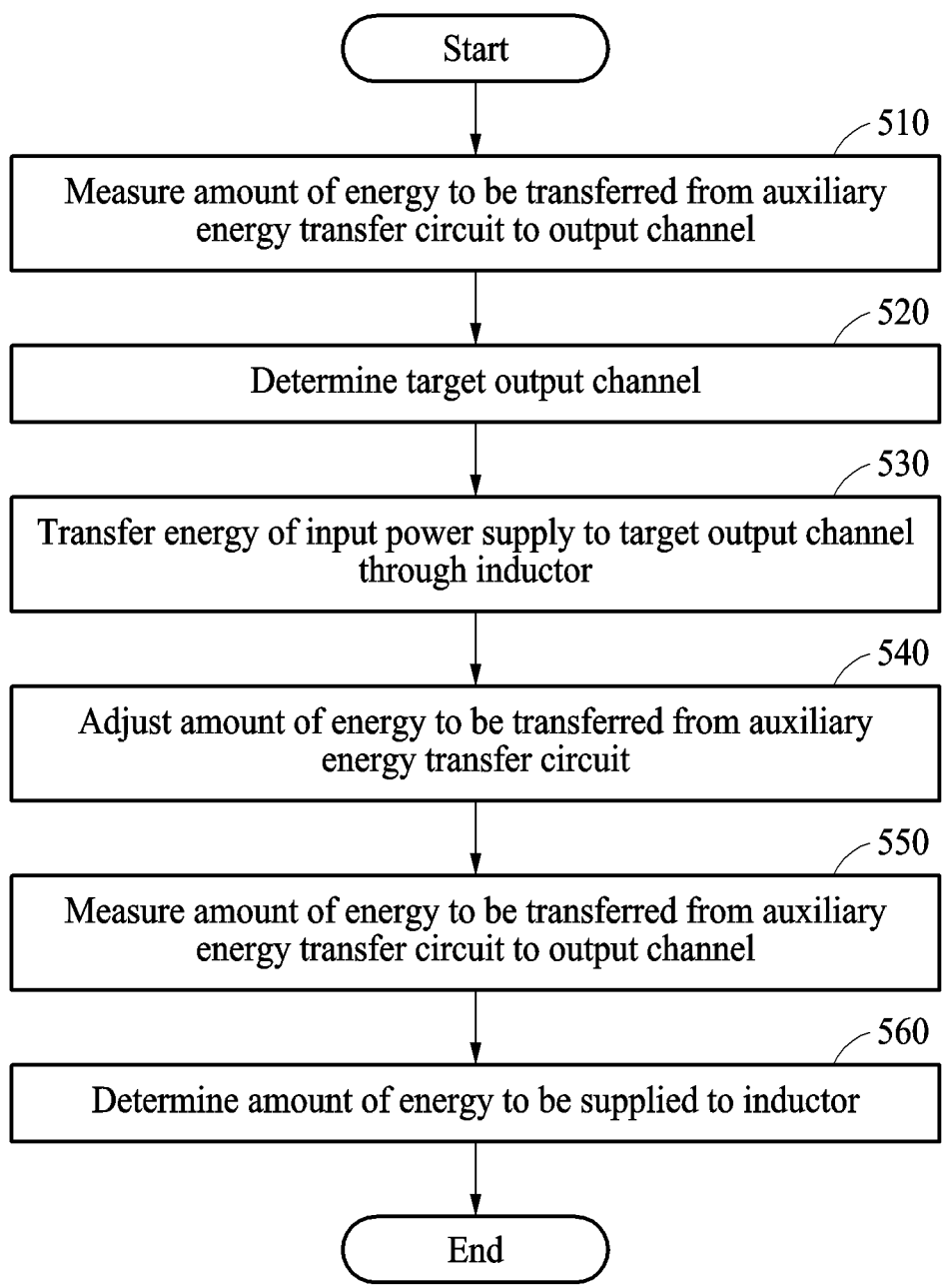
FIG. 5 is a flowchart illustrating an example of a method of controlling a voltage converting apparatus.

FIG. 5 is a flowchart illustrating an example of a method of controlling a voltage converting apparatus.

Referring to FIG. 5, in operation 510, the voltage converting apparatus measures an amount of energy to be transferred to an output channel from at least one auxiliary energy transfer circuit. The voltage converting apparatus includes individual auxiliary energy transfer circuits connected to different output channels. In operation 520, the voltage converting apparatus determines a target output channel to which energy of an input power supply is to be transferred through an inductor among the output channels. The voltage converting apparatus determines the target output channel based on a result of the measuring performed in operation 510, or based on error information estimated for an output of each of the output channels. In one example, the voltage converting apparatus determines, to be the target output channel, an output channel connected to an auxiliary energy transfer circuit transferring a greatest amount of energy among the auxiliary energy transfer circuits based on the result of the measuring performed in operation 510, or an output channel having a greatest error among errors estimated based on a difference between an output voltage of each output channel and a respective reference voltage.

In operation 530, the voltage converting apparatus transfers energy of the input power supply to the target output channel through the inductor. In operation 540, the voltage converting apparatus adjusts an amount of energy to be transferred from the auxiliary energy transfer circuit. In one example, the voltage converting apparatus adjusts a current to be transferred from the auxiliary energy transfer circuit to the output channel. The voltage converting apparatus determines whether the output voltage of each output channel is a target or desired voltage value, and determines whether to increase or decrease an output current of the auxiliary energy transfer circuit based on a result of the determining. For example, when an output voltage of an output channel is greater than a corresponding reference voltage of the output channel, the voltage converting apparatus decreases the output current of the auxiliary energy transfer circuit. Conversely, when the output voltage is less than the reference voltage, the voltage converting apparatus increases the output current of the auxiliary energy transfer circuit. Due to the increase or the decrease in the output current of the auxiliary energy transfer circuit, the output voltage of the output channel increases or decreases.

In operation 550, as in operation 510, the voltage converting apparatus measures an amount of energy to be transferred from the auxiliary energy transfer circuit to the output channel connected to the auxiliary energy transfer circuit. In operation 560, the voltage converting apparatus determines an amount of energy of the input power supply to be supplied to the inductor. For example, when energy is transferred from the auxiliary energy transfer circuit based on a result of the measuring performed in operation 550, or a sum of errors estimated for outputs of the output channels is greater than or equal to a threshold value, the voltage converting apparatus increases an amount of energy of the input power supply to be supplied to the inductor. Conversely, when energy is not being transferred from any of the auxiliary energy transfer circuits, or the sum of the errors estimated for the outputs of the output channels is less than the threshold value, the voltage converting apparatus maintains constant or decreases an amount of energy of the input power supply to be supplied to the inductor. That is, when an amount of energy being transferred from the inductor to the output channels is equal to an amount of energy required by the output channels, the voltage converting apparatus maintains constant an amount of energy of the input power supply to be supplied to the inductor. In contrast, when an amount of energy being transferred from the inductor to the output channels exceeds an amount of energy required by the output channels, the voltage converting apparatus decreases an amount of energy of the input power supply to be supplied to the inductor. Subsequently, operations 510 through 560 are repeated.

Figure 6:
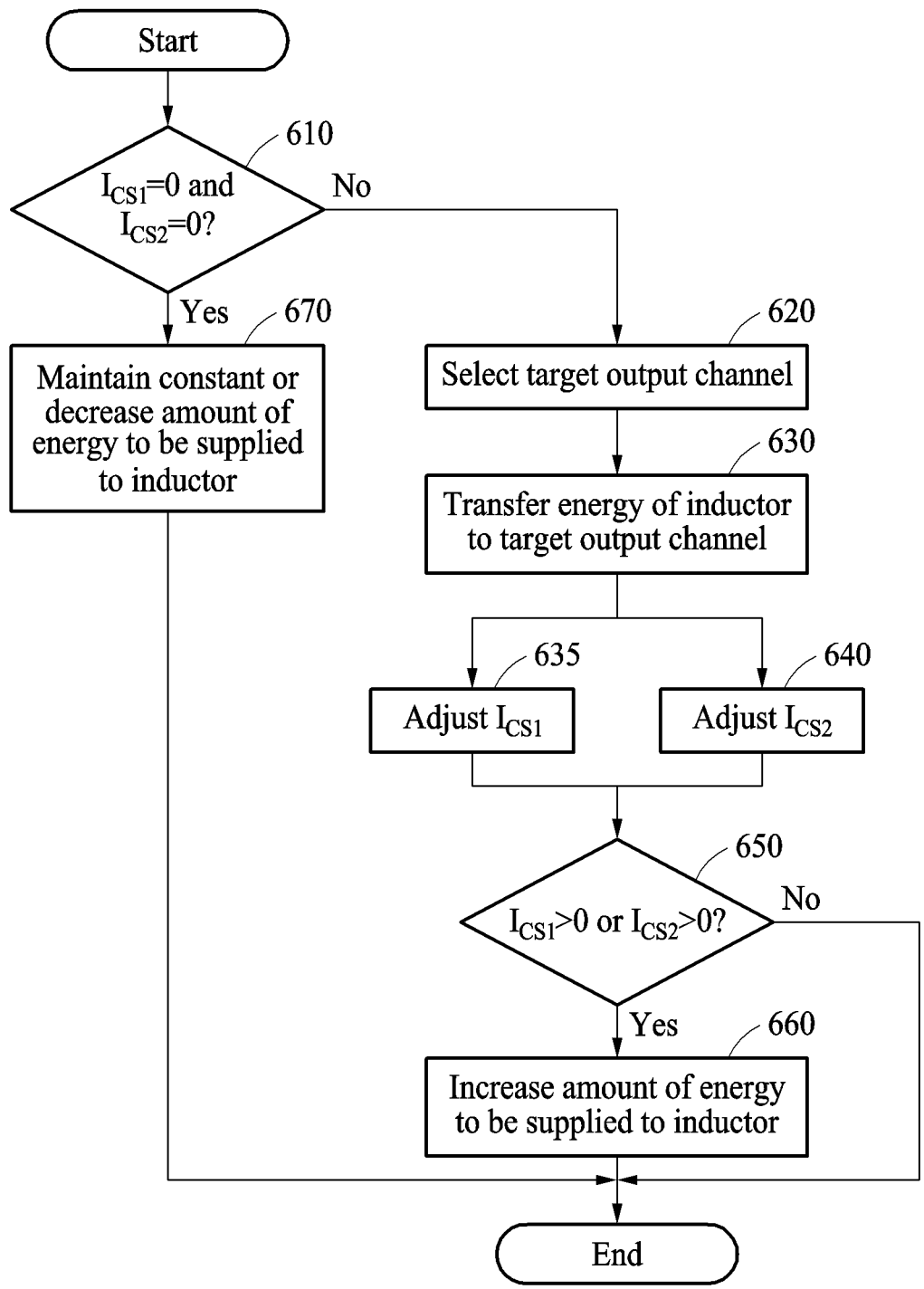
FIGS. 6 through 8 are flowcharts illustrating a detailed example of a method of controlling a voltage converting apparatus.
Figure 7:
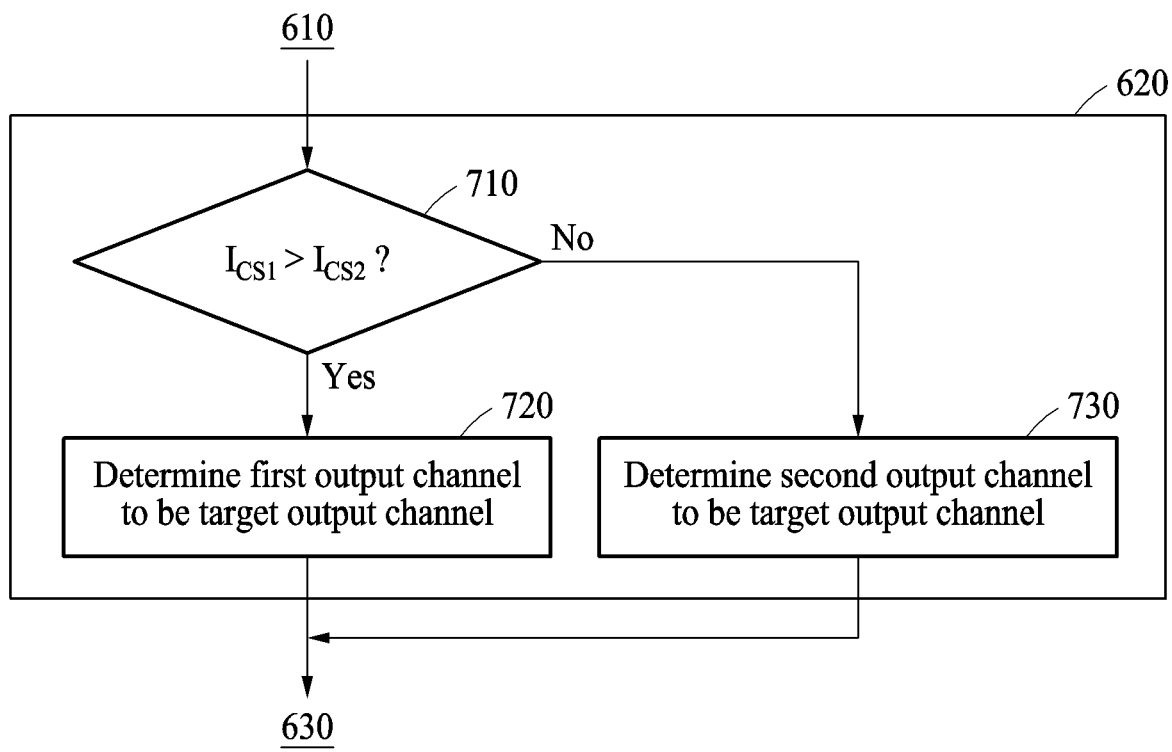
Figure 8:
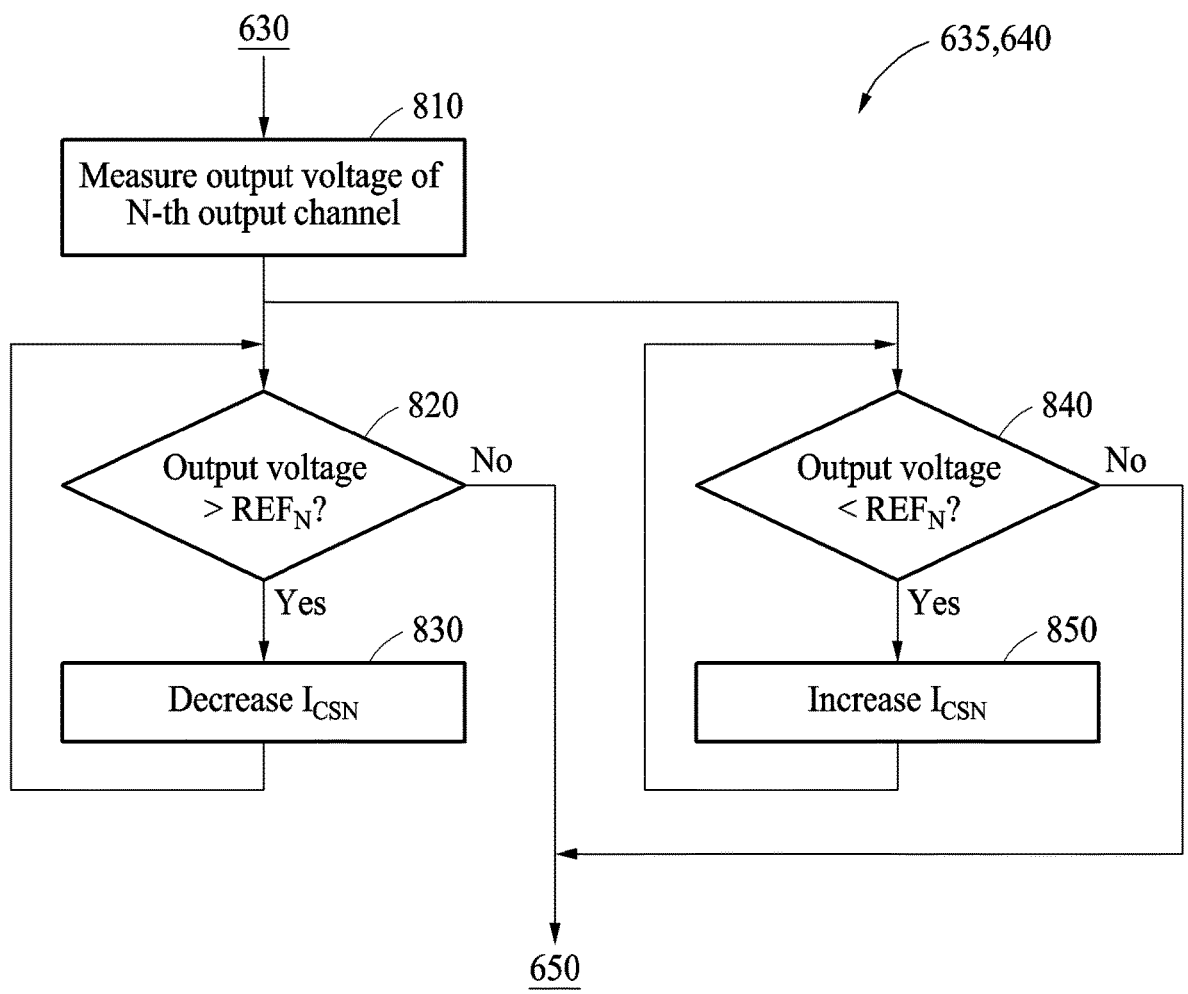

FIGS. 6 through 8 are flowcharts illustrating a detailed example of a method of controlling a voltage converting apparatus. In the example illustrated in FIGS. 6-8, it is assumed that a total number of output channels of the voltage converting apparatus is two, and a first output channel and a second output channel are connected respectively to a first auxiliary energy transfer circuit and a second auxiliary energy transfer circuit independently from each other.

Referring to FIG. 6, in operation 610, the voltage converting apparatus determines whether a current $I_{CS1}$ output from the first auxiliary energy transfer circuit and a current $I_{CS2}$ output from the second auxiliary energy transfer circuit are 0. When either one of the currents $I_{CS1}$ and $I_{CS2}$ is not 0, the voltage converting apparatus selects a target output channel from the two output channels to which energy of an input power supply is to be supplied through an inductor in operation 620. In one example, the voltage converting apparatus selects the target output channel in accordance with the flowchart illustrated in FIG. 7.

Referring to FIG. 7, in operation 710, the voltage converting apparatus determines whether the current $I_{CS1}$ is greater than the current $I_{CS2}$. When the current $I_{CS1}$ is greater than the current $I_{CS2}$, the voltage converting apparatus determines, to be the target output channel, the first output channel to which the current $I_{CS1}$ is to be supplied in operation 720. Conversely, when the current $I_{CS1}$ is not greater than the current $I_{CS2}$, the voltage converting apparatus determines, to be the target output channel, the second output channel to which the current $I_{CS2}$ is to be supplied in operation 730.

Referring back to FIG. 6, in operation 630, the voltage converting apparatus transfers energy of the inductor to the target output channel. In operations 635 and 640, the voltage converting apparatus adjusts the current $I_{CS1}$ or $I_{CS2}$ to be output from the auxiliary energy transfer circuit. In one example, the voltage converting apparatus adjusts the current $I_{CS1}$ or $I_{CS2}$ in accordance with the flowchart illustrated in FIG. 8.

Referring to FIG. 8, in operation 810, the voltage converting apparatus measures an output voltage of an N-th output channel. The N-th output channel is the first or the second output channel, and N used herein denotes 1 or 2. The voltage converting apparatus determines whether the output voltage of the N-the output channel is greater than a reference voltage $REF_N$ in operation 820, or less than the reference voltage $REF_N$ in operation 840. When the output voltage is determined to be greater than the reference voltage $REF_N$ in operation 820, the voltage converting apparatus decreases a current $I_{CSN}$ to be output from an N-th auxiliary energy transfer circuit connected to the N-th output channel in operation 830. Conversely, when the output voltage is determined to be less than the reference voltage $REF_N$ in operation 840, the voltage converting apparatus increases the current $I_{CSN}$ to be output from the N-th auxiliary energy transfer circuit in operation 850. When a difference between the output voltage of the N-th output channel and the reference voltage $REF_N$ is increases, a change (a decrease or an increase) in the current $I_{CSN}$ to be output from the N-th auxiliary energy transfer circuit increases.

Referring back to FIG. 6, in operation 650, the voltage converting apparatus determines whether the current $I_{CS1}$ or $I_{CS2}$ is greater than 0. When the current $I_{CS1}$ or $I_{CS2}$ is greater than 0, for example, when energy is transferred to at least one of the first and second output channels from at least one of the first and the second auxiliary energy transfer circuits, the voltage converting apparatus increases an amount of energy of the input power supply to be supplied to the inductor in operation 660. In one example, the voltage converting apparatus determines an amount of energy to be supplied to the inductor, for example, an amount of a current, to be transferred from the auxiliary energy transfer circuit based on a sum of errors estimated for outputs of the first and the second output channels.

When both the currents $I_{CS1}$ and $I_{CS2}$ are determined to be 0 in operation 610, for example, when energy is not being transferred from either one the first and the second auxiliary energy transfer circuits to either one of the first and the second output channels, this indicates that an amount of energy required by the first and the second output channels is being transferred through the inductor, or an amount of energy exceeding the required amount of energy is being transferred to the first and the second output channels. In such a case, the voltage converting apparatus maintains constant or decreases an amount of energy of the input power supply to be supplied to the inductor in operation 670.

That is, when an amount of energy being transferred from the inductor to the output channels is equal to an amount of energy required by the output channels, the voltage converting apparatus maintains constant an amount of energy of the input power supply to be supplied to the inductor. In contrast, when an amount of energy being transferred from the inductor to the output channels exceeds an amount of energy required by the output channels, the voltage converting apparatus decreases an amount of energy of the input power supply to be supplied to the inductor.

Figure 9:
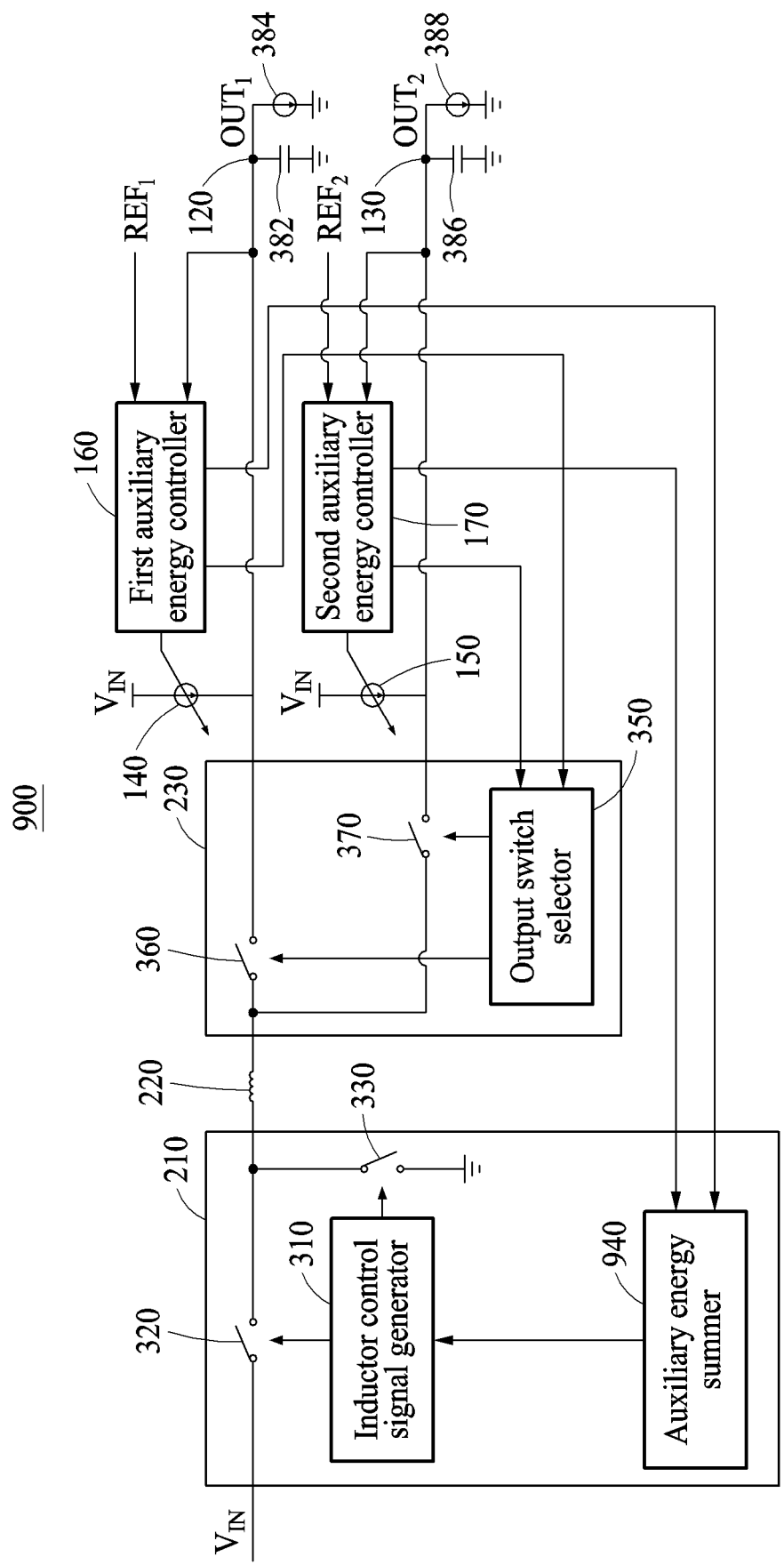
FIG. 9 is a diagram illustrating another example of a circuit of a voltage converting apparatus.

FIG. 9 is a diagram illustrating another example of a circuit 900 of a voltage converting apparatus.

Referring to FIG. 9, the circuit 900 of a voltage converting apparatus is identical to the circuit 300 of a voltage converting apparatus illustrated in FIG. 3, except that the output error summer 340 in FIG. 3 is replaced by the auxiliary energy summer 940 in FIG. 9. The auxiliary energy summer 940 receives information on the amounts of energy being transferred by the auxiliary energy transfer circuits 140 and 150 from the auxiliary energy controllers 160 and 170, and calculates a sum of the energies being transferred by the auxiliary energy transfer circuits 140 and 150 based on the received information. The inductor control signal generator 310 determines an amount of energy of the input power supply $V_{IN}$ to be supplied to the inductor 220 based on the sum of the energies being transferred by the auxiliary energy transfer circuits 140 and 150. Other than this, the circuit 900 operates in the same manner as the circuit 300 in FIG. 3. The description of FIG. 3 except for the description of the output error summer 340 is also applicable to FIG. 9, and thus will not be repeated here.

Figure 10:
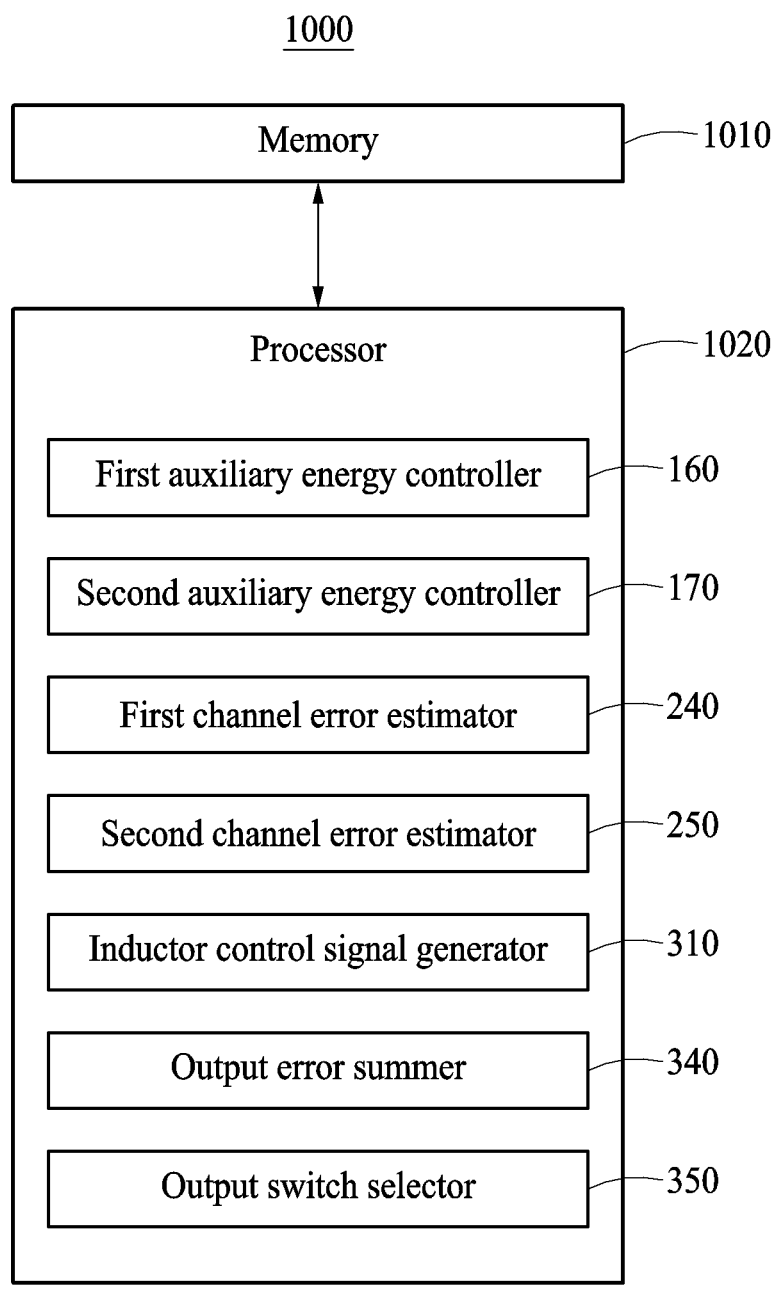
FIG. 10 illustrates an example of a block diagram of a controller of the voltage converting apparatuses 100 illustrated in FIGS. 1 and 2A-2D and the circuit 300 of a voltage converting apparatus illustrated in FIG. 3. The controller also performs the methods illustrated in FIGS. 5-8.

FIG. 10 illustrates an example of a block diagram of a controller of the voltage converting apparatuses 100 illustrated in FIGS. 1 and 2A-2D and the circuit 300 of a voltage converting apparatus illustrated in FIG. 3. The controller also performs the methods illustrated in FIGS. 5-8.

Referring to FIG. 10, a controller 1000 includes a memory 1010 and a processor 1020. The memory 1010 stores instructions that, when executed by the processor 1020, cause the processor 1020 to perform the functions of the first auxiliary energy controller 160 and the second auxiliary energy controller 170 illustrated in FIGS. 1, 2A-2D, and 3, the first channel error estimator 240 and the second channel error estimator 250 illustrated in FIGS. 2A-2D, and the inductor control signal generator 310, the output error summer 340, and the output switch selector 350 illustrated in FIG. 3, and also cause the processor 1020 to perform the methods illustrated in FIG. 5-8. Thus, the processor 1020 includes the first auxiliary energy controller 160, the second auxiliary energy controller 170, the first channel error estimator 240, the second channel error estimator 250, the inductor control signal generator 310, the output error summer 340, and the output switch selector 350. In another example, the output error summer 340 in FIG. 10 may be replaced by the auxiliary current summer 940 in FIG. 9. The descriptions of FIGS. 1-9 are also applicable to FIG. 10, and thus will not be repeated here.

The voltage converting apparatus described herein may be used to provide a plurality of output voltages to a portable electronic device such as a mobile phone and a personal digital assistance (PDA), a display device such as a monitor and a television (TV), a power source used for a biochip, a vehicle, and other electronic devices.

The first auxiliary energy controller 160 and the second auxiliary energy controller 170 in FIGS. 1, 2A-2D, and 3, the first channel error estimator 240 and the second channel error estimator 250 in FIGS. 2A-2D, and the inductor control signal generator 310, the output error summer 340, and the output switch selector 350 in FIG. 3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A voltage converting apparatus comprising:
a plurality of output channels configured to provide a plurality of output voltages;
a main energy transfer circuit configured to transfer, through an inductor, energy of an input power supply to a target output channel among the output channels; and
an auxiliary energy transfer circuit connected to one of the output channels and configured to transfer energy to the output channel connected to the auxiliary energy transfer circuit in response to the output channel connected to the auxiliary energy transfer circuit being in a load transient state,
wherein the auxiliary energy transfer circuit is isolated from the main energy transfer circuit and the inductor and transfers energy directly to the connected output channel independently of the main energy transfer circuit.

2. The apparatus of claim 1, wherein the auxiliary energy transfer circuit is configured to transfer energy to the output channel connected to the auxiliary energy transfer circuit in response to the output channel connected to the auxiliary energy transfer circuit needing energy.

3. The apparatus of claim 1, wherein the main energy transfer circuit is further configured to determine the target output channel to which energy of the input power supply is to be transferred through the inductor based on an amount of energy to be transferred from the auxiliary energy transfer circuit to the output channel connected to the auxiliary energy transfer circuit.

4. The apparatus of claim 1, wherein the main energy transfer circuit comprises:
the inductor, the inductor being configured to transfer energy of the input power supply to the target output channel; and
a processor configured to:
control an amount of energy of the input power supply to be supplied to the inductor; and
select, from the output channels, the target output channel to which energy of the inductor is to be transferred.

5. The apparatus of claim 4, further comprising a memory configured to store instructions;
wherein the processor is further configured to execute the instructions to configure the processor to:
control the amount of energy of the input power supply to be supplied to the inductor; and
select, from the output channels, the target output channel to which energy of the inductor is to be transferred.

6. The apparatus of claim 4, wherein the processor comprises:
an inductor controller configured to control the amount of energy of the input power supply to be supplied to the inductor; and
a channel selector configured to select, from the output channels, the target output channel to which energy of the inductor is to be transferred.

7. The apparatus of claim 6, wherein the inductor controller is further configured to determine the amount of energy of the input power supply to be supplied to the inductor based on an amount of energy to be transferred from the auxiliary energy transfer circuit to the output channel connected to the auxiliary energy transfer circuit.

8. The apparatus of claim 6, wherein the inductor controller is further configured to increase the amount of energy of the input power supply to be supplied to the inductor in response to energy being transferred from the auxiliary energy transfer circuit to the output channel connected to the auxiliary energy transfer circuit.

9. The apparatus of claim 6, wherein the inductor controller is further configured to maintain constant or decrease the amount of energy of the input power supply to be supplied to the inductor based on an amount of energy required by the output channels in response to energy not being transferred from the auxiliary energy transfer circuit to the output channel connected to the auxiliary energy transfer circuit.

10. The apparatus of claim 6, wherein the apparatus further comprises additional auxiliary energy transfer circuits respectively connected to remaining ones of the output channels so that the apparatus comprises a plurality of auxiliary energy transfer circuits respectively connected to the plurality of output channels in a one-to-one correspondence;
each of the auxiliary energy transfer circuits is configured to transfer energy to the respective output channel connected to the auxiliary energy transfer circuit in response to the respective output channel needing energy; and
the channel selector is further configured to determine, to be the target output channel, the respective output channel connected to a first auxiliary energy transfer circuit among the auxiliary energy transfer circuits in response to a first energy to be transferred from the first auxiliary energy transfer circuit being greater than a second energy to be transferred from a second auxiliary energy transfer circuit among the auxiliary energy transfer circuits.

11. The apparatus of claim 6, wherein the apparatus further comprises additional auxiliary energy transfer circuits respectively connected to remaining ones of the output channels so that the apparatus comprises a plurality of auxiliary energy transfer circuits respectively connected to the plurality of output channels in a one-to-one correspondence;
each of the auxiliary energy transfer circuits is configured to transfer energy to the respective output channel connected to the auxiliary energy transfer circuit in response to the respective output channel needing energy; and
the channel selector is further configured to determine, to be the target output channel, the respective output channel connected to an only auxiliary energy transfer circuit transferring energy among the auxiliary energy transfer circuits.

12. The apparatus of claim 6, wherein the apparatus further comprises additional auxiliary energy transfer circuits respectively connected to remaining ones of the output channels so that the apparatus comprises a plurality of auxiliary energy transfer circuits respectively connected to the plurality of output channels in a one-to-one correspondence;
each of the auxiliary energy transfer circuits is configured to transfer energy to the respective output channel connected to the auxiliary energy transfer circuit in response to the respective output channel needing energy; and the channel selector is further configured to determine, to be the target output channel, the respective output channel connected to an auxiliary energy transfer circuit transferring a greatest amount of energy among the auxiliary energy transfer circuits.

13. The apparatus of claim 6, wherein the channel selector is further configured to determine, to be the target output channel, an output channel having a greatest error value among error values estimated for respective outputs of the output channels.

14. The apparatus of claim 6, wherein the inductor controller is further configured to determine the amount of energy of the input power supply to be supplied to the inductor based on a sum of error values estimated for respective outputs of the output channels.

15. The apparatus of claim 6, wherein the inductor controller is further configured to determine the amount of energy of the input power supply to be supplied to the inductor based on a sum of error values estimated for respective outputs of the output channels and an amount of energy to be transferred from the auxiliary energy transfer circuit to the output channel connected to the auxiliary energy transfer circuit.

16. The apparatus of claim 1, further comprising a processor configured to control an amount of energy to be transferred from the auxiliary energy transfer circuit to the output channel connected to the auxiliary energy transfer circuit based on an output of the output channel connected to the auxiliary energy transfer circuit.

17. The apparatus of claim 16, further comprising a memory configured to store instructions;
wherein the processor is further configured to execute the instructions to configure the processor to control the amount of energy to be transferred from the auxiliary energy transfer circuit to the output channel connected to the auxiliary energy transfer circuit based on the output of the output channel connected to the auxiliary energy transfer circuit.

18. The apparatus of claim 16, wherein the processor comprises an auxiliary energy controller configured to control the amount of energy to be transferred from the auxiliary energy transfer circuit to the output channel connected to the auxiliary energy transfer circuit based on the output of the output channel connected to the auxiliary energy transfer circuit.

19. The apparatus of claim 1, wherein the auxiliary energy transfer circuit is configured to transfer, to the output channel connected to the auxiliary energy transfer circuit, energy of the input power supply or energy of an additional power supply different from the input power supply.

20. The apparatus of claim 1, further comprising additional auxiliary energy transfer circuits respectively connected to remaining ones of the output channels so that the apparatus comprises a plurality of auxiliary energy transfer circuits respectively connected to the plurality of output channels in a one-to-one correspondence.

21. The apparatus of claim 1, wherein the output channels are configured to output at least two different output voltages among the output channels.

22. A method of controlling a voltage converting apparatus, the method comprising:
measuring an amount of energy to be transferred from an auxiliary energy transfer circuit to an output channel among a plurality of output channels;
determining a target output channel among the output channels to which energy of an input power supply is to be transferred through an inductor based on a result of the measuring; and
transferring energy of the input power supply to the target output channel through the inductor in response to the target output channel being in a load transient state,
wherein the auxiliary energy transfer circuit is isolated from a main energy transfer circuit and the inductor and transfers energy directly to an output channel connected to the auxiliary energy transfer circuit independently of the main energy transfer circuit.

23. The method of claim 22, wherein the voltage converting apparatus comprises a plurality of auxiliary energy transfer circuits respectively connected to the plurality of output channels in a one-to-one correspondence;
each of the auxiliary energy transfer circuits is configured to transfer energy to the respective output channel connected to the auxiliary energy transfer circuit in response to the respective output channel needing energy; and
the determining of the target output channel comprises determining, to be the target output channel, the respective output channel connected to an auxiliary energy transfer circuit transferring a greatest amount of energy among the auxiliary energy transfer circuits.

24. The method of claim 22, further comprising controlling an amount of energy to be transferred from the auxiliary energy transfer circuit to the output channel connected to the auxiliary energy transfer circuit based on a result of comparing an output voltage of the output channel connected to the auxiliary energy transfer circuit with a reference voltage.

25. The method of claim 24, wherein the controlling of the amount of energy comprises:
decreasing the amount of energy to be transferred from the auxiliary energy transfer circuit to the output channel connected to the auxiliary energy transfer circuit in response to the output voltage of the output channel connected to the auxiliary energy transfer circuit being greater than the reference voltage; and
increasing the amount of energy to be transferred from the auxiliary energy transfer circuit to the output channel connected to the auxiliary energy transfer circuit in response to the output voltage of the output channel connected to the auxiliary energy transfer circuit being less than the reference voltage.

26. The method of claim 22, wherein the voltage converting apparatus comprises a plurality of auxiliary energy transfer circuits respectively connected to the plurality of output channels in a one-to-one correspondence;
each of the auxiliary energy transfer circuits is configured to transfer energy to the respective output channel connected to the auxiliary energy transfer circuit in response to the respective output channel needing energy; and
the method further comprises increasing an amount of the energy of the input power supply to be supplied to the inductor in response to energy being transferred from any one of the auxiliary energy transfer circuits to the respective output channel.

27. A voltage converting apparatus comprising:
a main energy transfer circuit including an inductor configured to receive energy from an input power supply at an input terminal of the inductor and output the energy from an output terminal of the inductor;
a plurality of output channels;

a plurality of auxiliary energy transfer circuits respectively connected to the plurality of output channels in a one-to-one correspondence, each of the auxiliary energy transfer circuits being configured to transfer energy to the respective output channel connected to the auxiliary energy transfer circuit in response to the output channel connected to the auxiliary energy transfer circuit being in a load transient state;

a first switch connecting the input terminal of the inductor to the input power supply;

a plurality of second switches respectively connecting the plurality of output channels to the output terminal of the inductor; and a processor configured to:
control the auxiliary energy transfer circuits to transfer respective amounts of energy needed by the respective output channels to the respective output channels;

control the second switches to connect one of the auxiliary energy transfer circuits to the output terminal of the inductor and disconnect all other ones of the auxiliary energy transfer circuits from the output terminal of the inductor based on respective amounts of energy being transferred by the auxiliary energy transfer circuits or respective outputs of the output channels; and control the first switch to adjust an amount of power supplied from the input power supply to the inductor based on either one or both of the respective amounts of energy being transferred by the auxiliary energy transfer circuits and the respective outputs of the output channels, wherein the auxiliary energy transfer circuits are isolated from the main energy transfer circuit and the inductor and transfer energy directly to their respectively connected output channels independently of the main energy transfer circuit.

28. The voltage converting apparatus of claim 27, further comprising a memory configured to store instructions;

wherein the processor is further configured to execute the instructions to configure the processor to:
control the auxiliary energy transfer circuits to transfer the respective amounts of energy needed by the respective output channels to the respective output channels;

control the second switches to connect the one of the auxiliary energy transfer circuits to the output terminal of the inductor and disconnect the all other ones of the auxiliary energy transfer circuits from the output terminal of the inductor based on the respective amounts of energy being transferred by the auxiliary energy transfer circuits or the respective outputs of the output channels; and control the first switch to adjust an amount of power supplied from the input power supply to the inductor based on either one or both of the respective amounts of energy being transferred by the auxiliary energy transfer circuits and the respective outputs of the output channels.

29. The voltage converting apparatus of claim 27, wherein the processor comprises:
a plurality of auxiliary energy controllers respectively configured to respectively control the auxiliary energy transfer circuits to transfer the respective amounts of energy needed by the respective output channels to the respective output channels;

an output switch selector configured to control the second switches to connect the one of the auxiliary energy transfer circuits to the output terminal of the inductor and disconnect the all other ones of the auxiliary energy transfer circuits from the output terminal of the inductor based on the respective amounts of energy being transferred by the auxiliary energy transfer circuits or the respective outputs of the output channels; and an inductor control signal generator configured to control the first switch to adjust an amount of power supplied from the input power supply to the inductor based on either one or both of the respective amounts of energy being transferred by the auxiliary energy transfer circuits and the respective outputs of the output channels.

30. The voltage converting apparatus of claim 29, wherein the auxiliary energy controllers are further configured to respectively estimate respective output errors of the output channels based on the respective outputs of the output channels;

the processor further comprises an output error summer configured to calculate a sum of the estimated respective output errors of the output channels; and the inductor control signal generator is further configured to control the first switch to adjust the amount of power supplied from the input power supply to the inductor based on the sum of the estimated respective output errors.

31. The voltage converting apparatus of claim 29, wherein the auxiliary energy controllers are further configured to respectively output information about the respective amounts of energy being transferred by the auxiliary energy transfer circuits;

the processor further comprises an auxiliary energy summer configured to calculate a sum of the respective amounts of energy being transferred by the auxiliary energy transfer circuits based on the information output by the auxiliary energy controllers; and the inductor control signal generator is further configured to control the first switch to adjust the amount of power supplied from the input power supply to the inductor based on the sum of the respective amounts of energy being transferred by the auxiliary energy transfer circuits.

* * * * *